(12) United States Patent
Walters et al.

(10) Patent No.: US 10,599,957 B2
(45) Date of Patent: Mar. 24, 2020

(54) SYSTEMS AND METHODS FOR DETECTING DATA DRIFT FOR DATA USED IN MACHINE LEARNING MODELS

(71) Applicant: CAPITAL ONE SERVICES, LLC, McLean, VA (US)

(72) Inventors: Austin Walters, Savoy, IL (US); Jeremy Goodsitt, Champaign, IL (US); Anh Truong, Champaign, IL (US); Fardin Abdi Taghi Abad, Champaign, IL (US); Mark Watson, Urbana, IL (US); Vincent Pham, Champaign, IL (US); Kate Key, Effingham, IL (US); Reza Farivar, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/172,344

(22) Filed: Oct. 26, 2018

(65) Prior Publication Data
US 2020/0012900 A1     Jan. 9, 2020

Related U.S. Application Data

(60) Provisional application No. 62/694,968, filed on Jul. 6, 2018.

(51) Int. Cl.
*G06N 20/00*     (2019.01)
*G06N 3/04*     (2006.01)
(Continued)

(52) U.S. Cl.
CPC ........... *G06K 9/6269* (2013.01); *G06F 16/93* (2019.01); *G06F 17/16* (2013.01); *G06N 3/04* (2013.01); *G06N 20/00* (2019.01); *G06Q 10/04* (2013.01)

(58) Field of Classification Search
CPC ...... G06N 20/00; G06K 9/6269; G06F 16/93; G06F 17/16; G06Q 10/04
See application file for complete search history.

(56) References Cited

U.S. PATENT DOCUMENTS 5,911,139 A     6/1999   Jain
5,974,549 A    10/1999   Golan
(Continued)

OTHER PUBLICATIONS

Kim, Yoon. "Convolutional neural networks for sentence classification." arXiv preprint arXiv:1408.5882 (2014). (Year: 2014).*
(Continued)

*Primary Examiner* — Eric Nilsson
(74) *Attorney, Agent, or Firm* — Finnegan, Henderson, Farabow, Garrett & Dunner, LLP

(57) ABSTRACT

A system and method for detecting data drift is disclosed. The system may be configured to perform a method, the method including receiving model training data and generating a predictive model. Generating the predictive model may include model training or hyperparameter tuning. The method may include receiving model input data and generating predicted data using the predictive model, based on the model input data. The method may include receiving event data and detecting data drift based on the predicted data and the event data. The method may include receiving current data and detecting data drift based on the data profile of the current data. The method may include model training and detecting data drift based on a difference in a trained model parameter from a baseline model parameter. The method may include hyperparameter tuning and detecting data drift based on a difference in a tuned hyperparameter from a baseline hyperparameter. The method may include correcting the model based on the detected data drift.

19 Claims, 20 Drawing Sheets

(51) Int. Cl.
*G06F 17/16* (2006.01)
*G06K 9/62* (2006.01)
*G06Q 10/04* (2012.01)
*G06F 16/93* (2019.01)

(56) References Cited

U.S. PATENT DOCUMENTS

| | | | |
|---|---|---|---|
| 6,137,912 | A | 10/2000 | Kostrzewski et al. |
| 6,269,351 | B1 | 7/2001 | Black |
| 6,456,990 | B1 | 9/2002 | Hofmann |
| 7,788,191 | B2 | 8/2010 | Jebara |
| 7,953,682 | B2 | 5/2011 | Smith |
| 8,375,014 | B1 | 2/2013 | Brocato |
| 8,375,032 | B2 | 2/2013 | Birdwell |
| 8,392,418 | B2 | 3/2013 | Birdwell |
| 8,484,215 | B2 | 7/2013 | Anderson |
| 8,548,951 | B2 | 10/2013 | Solmer |
| 8,706,659 | B1 | 4/2014 | Mann |
| 8,782,744 | B1 | 7/2014 | Fuller |
| 8,990,236 | B2 | 3/2015 | Mizrahy |
| 9,171,146 | B2 | 10/2015 | Vipat |
| 9,274,935 | B1 | 3/2016 | Lachwani |
| 9,462,013 | B1 | 10/2016 | Boss |
| 9,497,202 | B1 | 11/2016 | Calo |
| 9,608,809 | B1 | 3/2017 | Ghetti |
| 9,678,999 | B1 | 6/2017 | Gibas |
| 9,716,842 | B1 | 7/2017 | Worley |
| 9,754,190 | B1 | 9/2017 | Guttmann |
| 9,886,247 | B2 | 2/2018 | Laredo |
| 9,912,698 | B1 | 3/2018 | Thioux |
| 9,954,893 | B1 | 4/2018 | Zhao |
| 1,012,296 | A1 | 11/2018 | Lim |
| 1,021,242 | A1 | 2/2019 | Trepte |
| 1,028,290 | A1 | 5/2019 | Miller |
| 10,453,220 | B1 | 10/2019 | Mihal et al. |
| 2002/0103793 | A1 | 8/2002 | Koller |
| 2003/0003861 | A1 | 1/2003 | Kagemoto |
| 2003/0074368 | A1 | 4/2003 | Schuetze |
| 2006/0031622 | A1 | 2/2006 | Jardine |
| 2007/0169017 | A1 | 7/2007 | Coward |
| 2007/0271287 | A1 | 11/2007 | Acharya |
| 2008/0168339 | A1* | 7/2008 | Hudson .......... G06F 11/10 714/800 |
| 2008/0270363 | A1 | 10/2008 | Hunt |
| 2008/0288889 | A1 | 11/2008 | Hunt |
| 2009/0018996 | A1 | 1/2009 | Hunt |
| 2009/0055331 | A1 | 2/2009 | Stewart |
| 2009/0055477 | A1 | 2/2009 | Flesher |
| 2009/0110070 | A1 | 4/2009 | Takahashi et al. |
| 2009/0254971 | A1 | 10/2009 | Herz |
| 2010/0251340 | A1 | 9/2010 | Martin |
| 2010/0254627 | A1 | 10/2010 | Panahpour Tehrani et al. |
| 2010/0332210 | A1 | 12/2010 | Birdwell |
| 2010/0332474 | A1 | 12/2010 | Birdwell |
| 2012/0174224 | A1 | 7/2012 | Thomas |
| 2012/0284213 | A1* | 11/2012 | Lin .......... G06N 20/00 706/12 |
| 2013/0117830 | A1 | 5/2013 | Erickson |
| 2013/0124526 | A1 | 5/2013 | Birdwell |
| 2013/0159309 | A1 | 6/2013 | Birdwell |
| 2013/0159310 | A1 | 6/2013 | Birdwell |
| 2013/0167192 | A1 | 6/2013 | Hickman |
| 2014/0053061 | A1 | 2/2014 | Chasen |
| 2014/0195466 | A1 | 7/2014 | Phillipps |
| 2014/0201126 | A1 | 7/2014 | Zadeh |
| 2014/0278339 | A1 | 9/2014 | Aliferis |
| 2014/0324760 | A1 | 10/2014 | Marwah |
| 2014/0325662 | A1 | 10/2014 | Foster |
| 2014/0365549 | A1 | 12/2014 | Jenkins |
| 2015/0032761 | A1 | 1/2015 | Pasternack |
| 2015/0058388 | A1 | 2/2015 | Smigelski |
| 2015/0066793 | A1 | 3/2015 | Brown |
| 2015/0100537 | A1 | 4/2015 | Grieves |
| 2015/0220734 | A1 | 8/2015 | Nalluri |
| 2015/0241873 | A1 | 8/2015 | Goldenberg |
| 2015/0309987 | A1 | 10/2015 | Epstein |
| 2016/0019271 | A1 | 1/2016 | Ma |
| 2016/0057107 | A1 | 2/2016 | Call |
| 2016/0092476 | A1 | 3/2016 | Stojanovic |
| 2016/0092557 | A1 | 3/2016 | Stojanovic |
| 2016/0110657 | A1 | 4/2016 | Gibiansky |
| 2016/0119377 | A1 | 4/2016 | Goldberg |
| 2016/0132787 | A1 | 5/2016 | Drevo |
| 2016/0162688 | A1 | 6/2016 | Call |
| 2016/0197803 | A1 | 7/2016 | Talbot |
| 2016/0308900 | A1 | 10/2016 | Sadika |
| 2016/0371601 | A1* | 12/2016 | Grove .......... G06N 20/00 |
| 2017/0011105 | A1 | 1/2017 | Shet |
| 2017/0083990 | A1 | 3/2017 | Hou |
| 2017/0147930 | A1 | 5/2017 | Bellala |
| 2017/0220336 | A1 | 8/2017 | Chen |
| 2017/0236183 | A1 | 8/2017 | Klein et al. |
| 2017/0249432 | A1 | 8/2017 | Grantcharov |
| 2017/0331858 | A1 | 11/2017 | Clark, III |
| 2017/0359570 | A1 | 12/2017 | Holzer |
| 2018/0018590 | A1 | 1/2018 | Szeto |
| 2018/0108149 | A1 | 4/2018 | Levinshtein |
| 2018/0115706 | A1 | 4/2018 | Kang et al. |
| 2018/0150548 | A1 | 5/2018 | Shah |
| 2018/0165475 | A1 | 6/2018 | Veeramachaneni et al. |
| 2018/0165728 | A1* | 6/2018 | McDonald .......... G06Q 10/087 |
| 2018/0173730 | A1 | 6/2018 | Copenhaver |
| 2018/0173958 | A1 | 6/2018 | Hu et al. |
| 2018/0181802 | A1 | 6/2018 | Chen |
| 2018/0198602 | A1 | 7/2018 | Duffy |
| 2018/0199066 | A1 | 7/2018 | Ross et al. |
| 2018/0204111 | A1 | 7/2018 | Zadeh |
| 2018/0240041 | A1 | 8/2018 | Koch |
| 2018/0248827 | A1 | 8/2018 | Scharber |
| 2018/0253894 | A1 | 9/2018 | Krishnan |
| 2018/0260474 | A1 | 9/2018 | Surdeanu |
| 2018/0260704 | A1 | 9/2018 | Sun |
| 2018/0268286 | A1 | 9/2018 | Dasgupta |
| 2018/0307978 | A1 | 10/2018 | Ar |
| 2018/0336463 | A1 | 11/2018 | Bloom |
| 2018/0367484 | A1 | 12/2018 | Rodriguez |
| 2019/0005657 | A1 | 1/2019 | Gao |
| 2019/0026956 | A1 | 1/2019 | Gausebeck |
| 2019/0034833 | A1 | 1/2019 | Ding |
| 2019/0042290 | A1 | 2/2019 | Bailey |
| 2019/0051051 | A1 | 2/2019 | Kaufman |
| 2019/0057509 | A1 | 2/2019 | Lv |
| 2019/0147371 | A1 | 5/2019 | Deo |
| 2019/0196600 | A1 | 6/2019 | Rothberg |
| 2019/0220653 | A1 | 7/2019 | Wang |

OTHER PUBLICATIONS

Escovedo, Tatiana, et al. "DetectA: abrupt concept drift detection in non-stationary environments." Applied Soft Computing 62 (2017): 119-133. (Year: 2017).*

Beaulieu-Jones et al., Privacy-preserving generative deep neural networks support 1 clinical data sharing, Jul. 5, 2017, bioRxiv, total pp. 40, http://dx.doi.org/10.1101/159756 (Year: 2017).

Brkic et al., I Know That Person: Generative Full Body and Face De-Identification of People in Images, 2017 IEEE Conference on Computer Vision and Pattern Recognition Workshops, pp. 1319-1328 (Year: 2017).

C. Willems, T. Holz and F. Freiling, "Toward Automated Dynamic Malware Analysis Using CWSandbox," in IEEE Security & Privacy, vol. 5, No. 2, pp. 32-39, Mar.-Apr. 2007. (Year: 2007).

Dernoncourt, F., Lee, J. Y., Uzuner, 0., & Szolovits, P. (2017). De-identification of patient notes with recurrent neural networks. Journal of the American Medical Informatics Association, 24(3), 596-606. (Year: 2017).

Domadia, S. G., & Zaveri, T. (May 2011). Comparative analysis of unsupervised and supervised image classification techniques. In Proceeding of National Conference on Recent Trends in Engineering & Technology (pp. 1-5). (Year: 2011).

Gidaris, S., & Komodakis, N. (2017). Detect, replace, refine: Deep structured prediction for pixel wise labeling. In Proceedings of the IEEE Conference on Computer Vision and Pattern Recognition (pp. 5248-5257). (Year: 2017).

(56) References Cited

OTHER PUBLICATIONS

Hasegawa et al. Interoperability for Mobile Agents by Incarnation Agents. AAMAS'03 Jul. 14-18, 2003, Melbourne,Australia. (Year: 2003).

Jiang, Z., Zhao, C., He, B., Guan, Y., & Jiang, J. (2017). De-identification of medical records using conditional random fields and long short-term memory networks. Journal of biomedical informatics, 75, S43-S53. (Year: 2017).

Laszlo, M., & Mukherjee, S. (2013). Optimal univariate microaggregation with data suppression. Journal of Systems and Software, 86(3), 677-682. (Year: 2013).

Malekzadeh et al., Replacement Auto Encoder: A Privacy-Preserving Algorithm for Sensory Data Analysis, 2018 IEEE/ACM Third International Conference on Internet-of-Things Design and Implementation, pp. 166-176 (Year: 2018).

Marc Aurelio Ranzato, Arthur Szlam, Joan Bruna, Michael Mathieu, Ronan Collobert, and Sumit Chopra, "Video ( Language) Modeling: A Baseline for Generative Models of Natural Videos", Article, May 4, 2016, 15 pages, Courant Institute of Mathematical Sciences.

Matthias Feurer, Jost Tobias Springenberg, Aaron Klein, Manuel Blum, Katharina Eggensperger, and Frank Hutter, "Efficient and Robust Automated Machine Learning", Advances in Neural Information Processing Systems 28 (Dec. 2015) http://papers.nips.cc/pa.

Park et al., Data Synthesis based on Generative Adversarial Networks, Aug. 2018, Proceedings of the VLDB Endowment, vol. 11, No. 10, pp. 1071-1083 (Year: 2018).

Qin Gao, Will Lewis, Chris Quirk, and Mei-Yuh Hwang. 2011. Incremental training and intentional over-fitting of word alignment. In Proceedings of MT Summit XIII. (Year: 2011).

Roberts, Mike. "Serverless Architectures". https://martinfowler.com/articles/serverless.html. May 22, 2018. Accessed Jul. 22, 2019. ( Year: 2018).

Vendrick, Carl, Hamed Pirsiavash, and Antonio Torralba. "Generating videos with scene dynamics." Advances in Neural Information Processing Systems. 2016 (Year: 2016).

Wiktionary. "Spin Up". https://en.wiktionary.org/w/index.php?title=spin_up&oldid=49727714. Jun. 15, 2018. Accessed Jul. 19, 2019. (Year: 2018).

Xue, Tianfan, etal. "Visual dynamics: Probabilistic future frame synthesis via cross convolutional networks." Advances in Neural Information Processing Systems. 2016 (Year: 2016).

\* cited by examiner

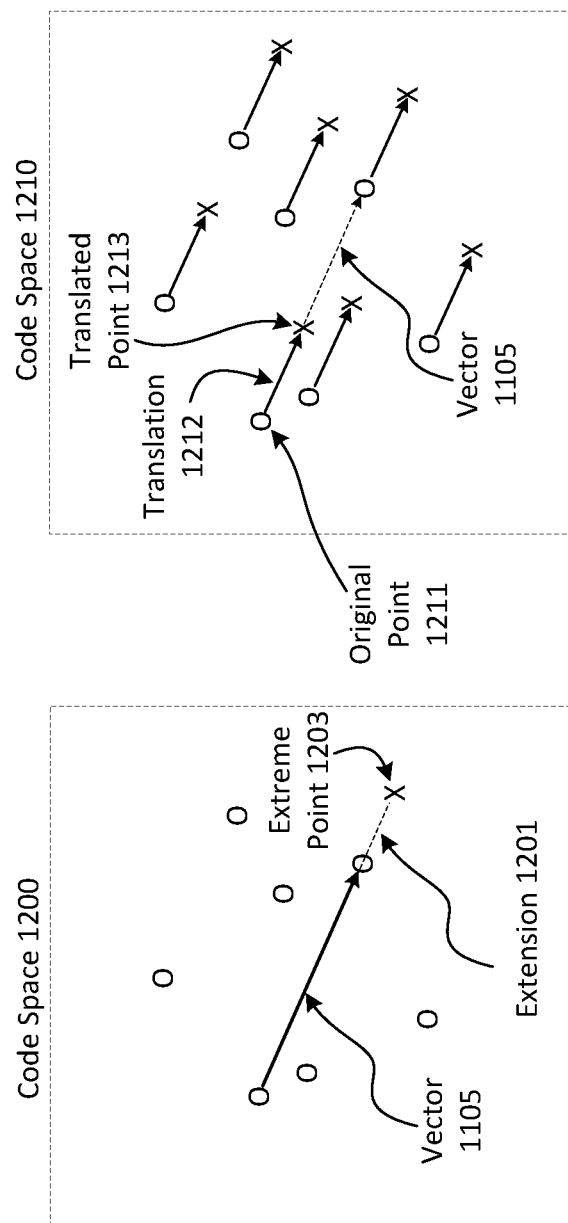

1700

Receive a Model Generation Request 1701

↓

Retrieve from a Model Storage a Stored Model and a Stored Hyperparameter Value 1703

↓

Provision Computing Resources with the Stored Model According to the Stored Hyperparameter Value 1705

↓

Provision the Computing Resources with the Stored Model According to a New Hyperparameter Value 1707

↓

Determine Satisfaction of a Termination Condition 1709

↓

Store the Second Trained Model and the New Hyperparameter Value in the Model Storage 1711

↓

Update the model index to include the second trained model and the new hyperparameter value 1713

↓

Provide the second trained model in response to the model generation request 1715

Fig. 17

SYSTEMS AND METHODS FOR DETECTING DATA DRIFT FOR DATA USED IN MACHINE LEARNING MODELS

CROSS REFERENCE TO RELATED APPLICATIONS

This application claims the benefit of U.S. Provisional Application No. 62/694,968, filed Jul. 6, 2018, and incorporated herein by reference in its entirety.

This application also relates to U.S. patent application Ser. No. 16/151,385 filed on Oct. 4, 2018, and titled Data Model Generation Using Generative Adversarial Networks, the disclosure of which is also incorporated herein by reference in its entirety.

TECHNICAL FIELD

The disclosed embodiments concern a platform for management of artificial intelligence systems. In particular, the disclosed embodiments concern detecting data drift in data used for synthetic data models or predictive models, including classification models or forecasting models, the models being built using artificial intelligence systems.

SUMMARY

There is a need for detecting data drift used in synthetic data models and predictive models in a variety of fields, including, for example, economics, finance, business, climate science, environmental science, physics, engineering, medicine, biomedical devices, biology, microbiology, virology, ecology, demographics, politics, transportation, or other fields. Predictive models include classification models and forecasting models. Over time, the data profile used in synthetic data models and/or predictive models may drift. That is, the data schema or the statistical properties of the data may drift. As an example of data schema drift, the organization of the input variables change so that a data set may no longer be able to be parsed with a previously-used parser (e.g., data columns may be removed or renamed). As an example of statistical drift, the data may experience drift in the covariance matrix, data distribution, dependencies, means, variances, frequencies, or the like. When data experiences statistical drift, for example, an important explanatory variable of an outcome at one point in time may be more or less important later, or new predictors may arise. Predictors of household wealth in 2008, for example, may be less relevant in 2018. Such data drift is important to understand for decision making, and it is important to detect data drift before data models become obsolete.

Data drift presents challenges to synthetic data models or predictive models. In some cases, synthetic data models may generate synthetic data based on actual data for training downstream predictive models, and the actual data may drift over time, resulting in drift in the synthetic data.

In some cases, actual data or synthetic data used in predictive models (e.g., forecasting models or classification models), and actual data may drift as real-world conditions change. For example, a predictive model may be trained using training data generated under a set of background conditions, but these background conditions may change over time. As a result, the event data (e.g., actual time series data, future classification, or outcome data) and predicted data may diverge over time unless the predictive model is corrected. As another example, a classification model that categorizes a potential borrower as "low credit risk" or "high credit risk" may need to be updated as risk factors change, causing data drift (e.g., as the economy changes, potential borrowers with employment in a particular field may be more or less likely to be "high credit risk").

Further, in situations where a synthetic data model or predictive model is retrained using new data, the model may continue to provide accurate results Nevertheless, the model may drift over time as it is retrained on data that has drifted. The model may experience shifts in model parameters or hyperparameters, making data drift may be difficult for users to detect. Further, when models are provided to users, the users may be unable to train or update the model based on drift without further intervention from the model provider, so the user depends on the provider to provide updated models. Therefore, systems and methods are needed to detect data drift, correct synthetic data models or predictive models for drift, and notify downstream users.

Conventionally, for complex synthetic data or predictive models such as machine learning models, users detect data drift only when a model fails (e.g., the model crashes, produces an absurd result, or produces a sufficiently different prediction from the eventual real-world outcome). Running a model may be expensive, consume large computing resources, and take long time periods (e.g., days), so models are typically used sparingly. Further, identifying why a model fails may be difficult, time consuming, and incur additional costs. Therefore, there is a need to efficiently identify data drift early, before spending money, resources, or time on an obsolete model.

The unconventional systems and methods presented herein provide advantages over the conventional approaches identified above by detecting data drift before models fail, become obsolete, or need to be retrained.

The disclosed embodiments include a system configured to perform operations for detecting data drift. The system may include one or more memory units and one or more operations configured to perform the operations. The operations may include receiving model training data and generating a predictive model. Generating the predictive model may include model training or hyperparameter tuning. The operations may include receiving model input data and generating predicted data using the predictive model, based on the model input data. The operations may include receiving event data and detecting data drift based on the predicted data and the event data. In some embodiments, the operations include receiving current data and detect data drift based on the data profile of the current data. In some embodiments, the operations include training a model training and detecting data drift based on a difference in a trained model parameter from a baseline model parameter. The operations may include hyperparameter tuning and detecting data drift based on a difference in a tuned hyperparameter from a baseline hyperparameter. The operations may include correcting the model based on the detected data drift.

Consistent with disclosed embodiments, a method for detecting data drift is disclosed. The method may include receiving model training data and generating a predictive model. Generating the predictive model may include model training or hyperparameter tuning. The method may include receiving model input data and generating predicted data using the predictive model, based on the model input data. The method may include receiving event data and detecting data drift based on the predicted data and the event data. In some embodiments, the method includes receiving current data and detect data drift based on the data profile of the current data. In some embodiments, the method includes training a model training and detecting data drift based on a difference in a trained model parameter from a baseline model parameter. The method may include hyperparameter tuning and detecting data drift based on a difference in a tuned hyperparameter from a baseline hyperparameter. The method may include correcting the model based on the detected data drift.

Consistent with other disclosed embodiments, non-transitory computer readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings:

FIG. 12A depicts an exemplary illustration of supplementing datasets using code-space operations, consistent with disclosed embodiments.

FIG. 12B depicts an exemplary illustration of transforming datasets using code-space operations, consistent with disclosed embodiments.

FIG. 17 depicts a process for hyperparameter tuning, consistent with disclosed embodiments.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

The disclosed embodiments can be used to create models of datasets, which may include sensitive datasets (e.g., customer financial information, patient healthcare information, and the like). Using these models, the disclosed embodiments can produce fully synthetic datasets with similar structure and statistics as the original sensitive or non-sensitive datasets. The disclosed embodiments also provide tools for desensitizing datasets and tokenizing sensitive values. In some embodiments, the disclosed systems can include a secure environment for training a model of sensitive data, and a non-secure environment for generating synthetic data with similar structure and statistics as the original sensitive data. In various embodiments, the disclosed systems can be used to tokenize the sensitive portions of a dataset (e.g., mailing addresses, social security numbers, email addresses, account numbers, demographic information, and the like). In some embodiments, the disclosed systems can be used to replace parts of sensitive portions of the dataset (e.g., preserve the first or last 3 digits of an account number, social security number, or the like; change a name to a first and last initial). In some aspects, the dataset can include one or more JSON (JavaScript Object Notation) or delimited files (e.g., comma-separated value, or CSV, files). In various embodiments, the disclosed systems can automatically detect sensitive portions of structured and unstructured datasets and automatically replace them with similar but synthetic values.

Figure 1:
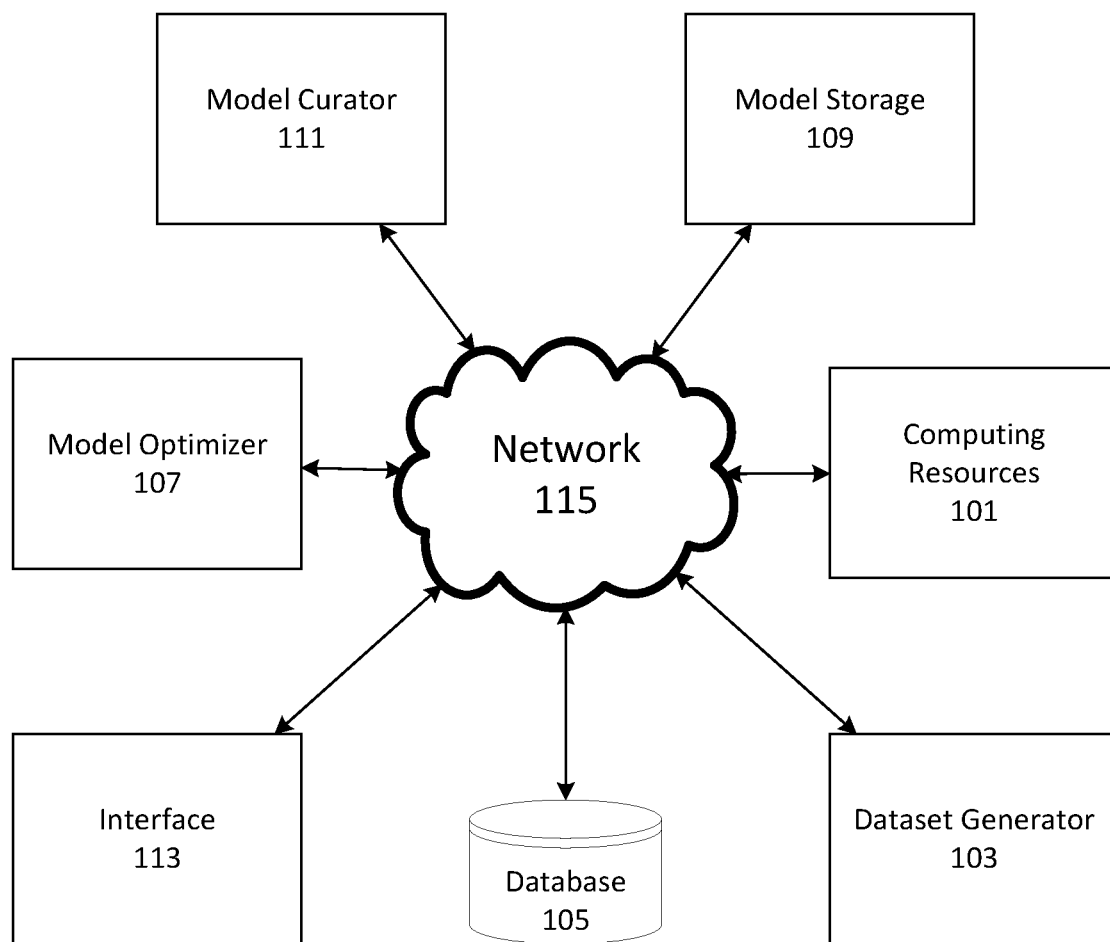
FIG. 1 depicts an exemplary cloud-computing environment for generating data models, consistent with disclosed embodiments.

FIG. 1 depicts a cloud-computing environment 100 for generating data models. Environment 100 can be configured to support generation and storage of synthetic data, generation and storage of data models, optimized choice of parameters for machine learning, and imposition of rules on synthetic data and data models. Environment 100 can be configured to expose an interface for communication with other systems. Environment 100 can include computing resources 101, dataset generator 103, database 105, model optimizer 107, model storage 109, model curator 111, and interface 113. These components of environment 100 can be configured to communicate with each other, or with external components of environment 100, using network 115. The particular arrangement of components depicted in FIG. 1 is not intended to be limiting. System 100 can include additional components, or fewer components. Multiple components of system 100 can be implemented using the same physical computing device or different physical computing devices.

Computing resources 101 can include one or more computing devices configurable to train data models. The computing devices can be special-purpose computing devices, such as graphical processing units (GPUs) or application-specific integrated circuits. The cloud computing instances can be general-purpose computing devices. The computing devices can be configured to host an environment for training data models. For example, the computing devices can host virtual machines, pods, or containers. The computing devices can be configured to run applications for generating data models. For example, the computing devices can be configured to run SAGEMAKER, or similar machine learning training applications. Computing resources 101 can be configured to receive models for training from model optimizer 107, model storage 109, or another component of system 100. Computing resources 101 can be configured provide training results, including trained models and model information, such as the type and/or purpose of the model and any measures of classification error.

Dataset generator 103 can include one or more computing devices configured to generate data. Dataset generator 103 can be configured to provide data to computing resources 101, database 105, to another component of system 100 (e.g., interface 113), or another system (e.g., an APACHE KAFKA cluster or other publication service). Dataset generator 103 can be configured to receive data from database 105 or another component of system 100. Dataset generator 103 can be configured to receive data models from model storage 109 or another component of system 100. Dataset generator 103 can be configured to generate synthetic data. For example, dataset generator 103 can be configured to generate synthetic data by identifying and replacing sensitive information in data received from database 103 or interface 113. As an additional example, dataset generator 103 can be configured to generate synthetic data using a data model without reliance on input data. For example, the data model can be configured to generate data matching statistical and content characteristics of a training dataset. In some aspects, the data model can be configured to map from a random or pseudorandom vector to elements in the training data space.

Database 105 can include one or more databases configured to store data for use by system 100. The databases can include cloud-based databases (e.g., AMAZON WEB SERVICES S3 buckets) or on-premises databases.

Model optimizer 107 can include one or more computing systems configured to manage training of data models for system 100. Model optimizer 107 can be configured to generate models for export to computing resources 101. Model optimizer 107 can be configured to generate models based on instructions received from a user or another system. These instructions can be received through interface 113. For example, model optimizer 107 can be configured to receive a graphical depiction of a machine learning model and parse that graphical depiction into instructions for creating and training a corresponding neural network on computing resources 101. Model optimizer 107 can be configured to select model training parameters. This selection can be based on model performance feedback received from computing resources 101. Model optimizer 107 can be configured to provide trained models and descriptive information concerning the trained models to model storage 109.

Model storage 109 can include one or more databases configured to store data models and descriptive information for the data models. Model storage 109 can be configured to provide information regarding available data models to a user or another system. This information can be provided using interface 113. The databases can include cloud-based databases (e.g., AMAZON WEB SERVICES S3 buckets) or on-premises databases. The information can include model information, such as the type and/or purpose of the model and any measures of classification error.

Model curator 111 can be configured to impose governance criteria on the use of data models. For example, model curator 111 can be configured to delete or control access to models that fail to meet accuracy criteria. As a further example, model curator 111 can be configured to limit the use of a model to a particular purpose, or by a particular entity or individual. In some aspects, model curator 11 can be configured to ensure that data model satisfies governance criteria before system 100 can process data using the data model.

Interface 113 can be configured to manage interactions between system 100 and other systems using network 115. In some aspects, interface 113 can be configured to publish data received from other components of system 100 (e.g., dataset generator 103, computing resources 101, database 105, or the like). This data can be published in a publication and subscription framework (e.g., using APACHE KAFKA), through a network socket, in response to queries from other systems, or using other known methods. The data can be synthetic data, as described herein. As an additional example, interface 113 can be configured to provide information received from model storage 109 regarding available datasets. In various aspects, interface 113 can be configured to provide data or instructions received from other systems to components of system 100. For example, interface 113 can be configured to receive instructions for generating data models (e.g., type of data model, data model parameters, training data indicators, training parameters, or the like) from another system and provide this information to model optimizer 107. As an additional example, interface 113 can be configured to receive data including sensitive portions from another system (e.g. in a file, a message in a publication and subscription framework, a network socket, or the like) and provide that data to dataset generator 103 or database 105.

Network 115 can include any combination of electronics communications networks enabling communication between components of system 100. For example, network 115 may include the Internet and/or any type of wide area network, an intranet, a metropolitan area network, a local area network (LAN), a wireless network, a cellular communications network, a Bluetooth network, a radio network, a device bus, or any other type of electronics communications network known to one of skill in the art.

Figure 2:
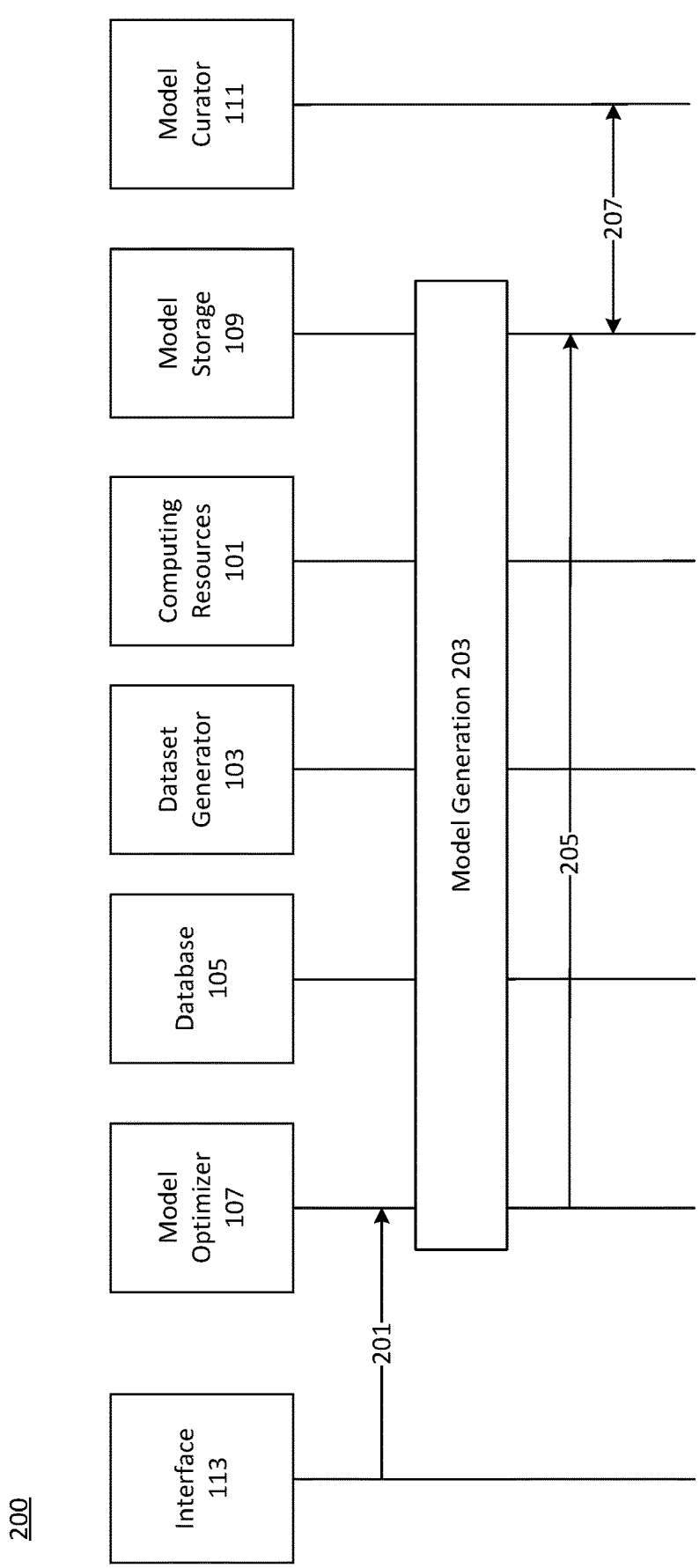
FIG. 2 depicts an exemplary process for generating data models, consistent with disclosed embodiments.

FIG. 2 depicts a process 200 for generating data models. Process 200 can be used to generate a data model for a machine learning application, consistent with disclosed embodiments. The data model can be generated using synthetic data in some aspects. This synthetic data can be generated using a synthetic dataset model, which can in turn be generated using actual data. The synthetic data may be similar to the actual data in terms of values, value distributions (e.g., univariate and multivariate statistics of the synthetic data may be similar to that of the actual data), structure and ordering, or the like. In this manner, the data model for the machine learning application can be generated without directly using the actual data. As the actual data may include sensitive information, and generating the data model may require distribution and/or review of training data, the use of the synthetic data can protect the privacy and security of the entities and/or individuals whose activities are recorded by the actual data.

Process 200 can then proceed to step 201. In step 201, interface 113 can provide a data model generation request to model optimizer 107. The data model generation request can include data and/or instructions describing the type of data model to be generated. For example, the data model generation request can specify a general type of data model (e.g., neural network, recurrent neural network, generative adversarial network, kernel density estimator, random data generator, or the like) and parameters specific to the particular type of model (e.g., the number of features and number of layers in a generative adversarial network or recurrent neural network). In some embodiments, a recurrent neural network can include long short term memory modules (LSTM units), or the like.

Process 200 can then proceed to step 203. In step 203, one or more components of system 100 can interoperate to generate a data model. For example, as described in greater detail with regard to FIG. 3, a data model can be trained using computing resources 101 using data provided by dataset generator 103. In some aspects, this data can be generated using dataset generator 103 from data stored in database 105. In various aspects, the data used to train dataset generator 103 can be actual or synthetic data retrieved from database 105. This training can be supervised by model optimizer 107, which can be configured to select model parameters (e.g., number of layers for a neural network, kernel function for a kernel density estimator, or the like), update training parameters, and evaluate model characteristics (e.g., the similarity of the synthetic data generated by the model to the actual data). In some embodiments, model optimizer 107 can be configured to provision computing resources 101 with an initialized data model for training. The initialized data model can be, or can be based upon, a model retrieved from model storage 109.

Process 200 can then proceed to step 205. In step 205, model optimizer 107 can evaluate the performance of the trained synthetic data model. When the performance of the trained synthetic data model satisfies performance criteria, model optimizer 107 can be configured to store the trained synthetic data model in model storage 109. For example, model optimizer 107 can be configured to determine one or more values for similarity and/or predictive accuracy metrics, as described herein. In some embodiments, based on values for similarity metrics, model optimizer 107 can be configured to assign a category to the synthetic data model.

According to a first category, the synthetic data model generates data maintaining a moderate level of correlation or similarity with the original data, matches well with the original schema, and does not generate too many row or value duplicates. According to a second category, the synthetic data model may generate data maintaining a high level of correlation or similarity of the original level, and therefore could potentially cause the original data to be discernable from the original data (e.g., a data leak). A synthetic data model generating data failing to match the schema with the original data or providing many duplicated rows and values may also be placed in this category. According to a third category, the synthetic data model may likely generate data maintaining a high level of correlation or similarity with the original data, likely allowing a data leak. A synthetic data model generating data badly failing to match the schema with the original data or providing far too many duplicated rows and values may also be placed in this category.

In some embodiments, system 100 can be configured to provide instructions for improving the quality of the synthetic data model. If a user requires synthetic data reflecting less correlation or similarity with the original data, the use can change the models' parameters to make them perform worse (e.g., by decreasing number of layers in GAN models, or reducing the number of training iterations). If the users want the synthetic data to have better quality, they can change the models' parameters to make them perform better (e.g., by increasing number of layers in GAN models, or increasing the number of training iterations).

Process 200 can then proceed to step 207, in step 207, model curator 111 can evaluate the trained synthetic data model for compliance with governance criteria.

Figure 3:
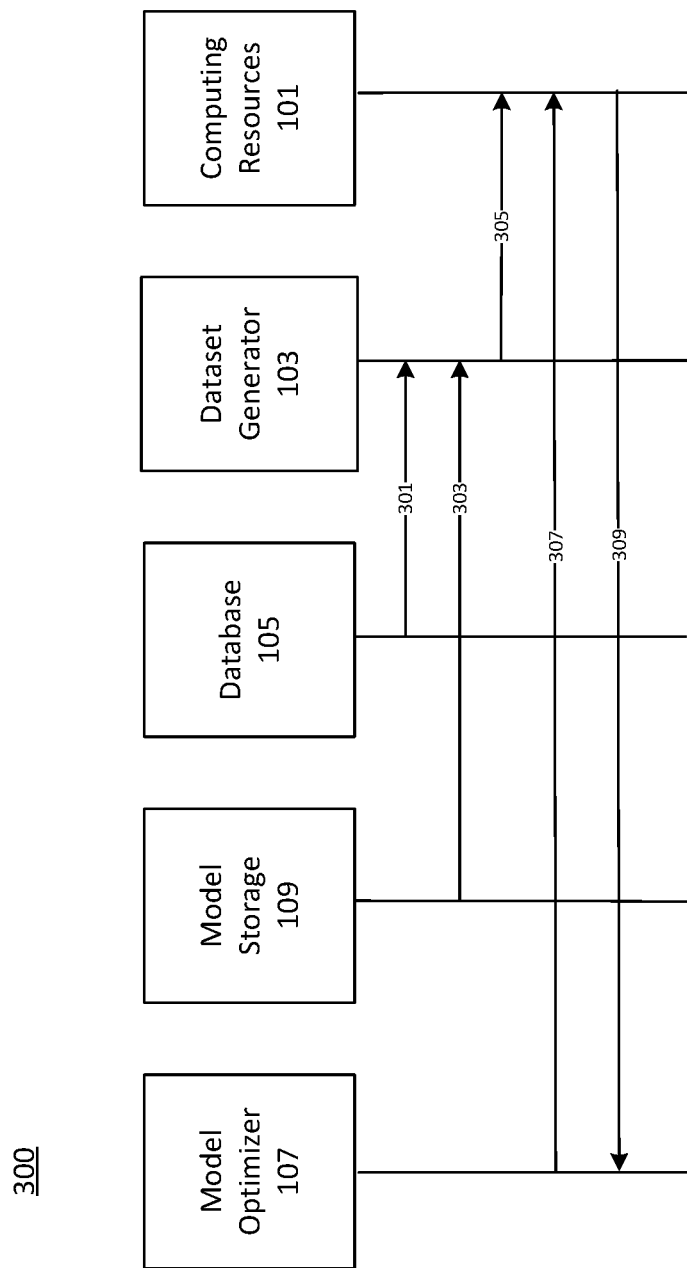
FIG. 3 depicts an exemplary process for generating synthetic data using existing data models, consistent with disclosed embodiments.

FIG. 3 depicts a process 300 for generating a data model using an existing synthetic data model, consistent with disclosed embodiments. Process 300 can include the steps of retrieving a synthetic dataset model from model storage 109, retrieving data from database 105, providing synthetic data to computing resources 101, providing an initialized data model to computing resources 101, and providing a trained data model to model optimizer 107. In this manner, process 300 can allow system 100 to generate a model using synthetic data.

Process 300 can then proceed to step 301. In step 301, dataset generator 103 can retrieve a training dataset from database 105. The training dataset can include actual training data, in some aspects. The training dataset can include synthetic training data, in some aspects. In some embodiments, dataset generator 103 can be configured to generate synthetic data from sample values. For example, dataset generator 103 can be configured to use the generative network of a generative adversarial network to generate data samples from random-valued vectors. In such embodiments, process 300 may forgo step 301.

Process 300 can then proceed to step 303. In step 303, dataset generator 103 can be configured to receive a synthetic data model from model storage 109. In some embodiments, model storage 109 can be configured to provide the synthetic data model to dataset generator 103 in response to a request from dataset generator 103. In various embodiments, model storage 109 can be configured to provide the synthetic data model to dataset generator 103 in response to a request from model optimizer 107, or another component of system 100. As a non-limiting example, the synthetic data model can be a neural network, recurrent neural network (which may include LSTM units), generative adversarial network, kernel density estimator, random value generator, or the like.

Process 300 can then proceed to step 305. In step 305, in some embodiments, dataset generator 103 can generate synthetic data. Dataset generator 103 can be configured, in some embodiments, to identify sensitive data items (e.g., account numbers, social security numbers, names, addresses, API keys, network or IP addresses, or the like) in the data received from model storage 109. In some embodiments, dataset generator 103 can be configured to identify sensitive data items using a recurrent neural network. Dataset generator 103 can be configured to use the data model retrieved from model storage 109 to generate a synthetic dataset by replacing the sensitive data items with synthetic data items.

Dataset generator 103 can be configured to provide the synthetic dataset to computing resources 101. In some embodiments, dataset generator 103 can be configured to provide the synthetic dataset to computing resources 101 in response to a request from computing resources 101, model optimizer 107, or another component of system 100. In various embodiments, dataset generator 103 can be configured to provide the synthetic dataset to database 105 for storage. In such embodiments, computing resources 101 can be configured to subsequently retrieve the synthetic dataset from database 105 directly, or indirectly through model optimizer 107 or dataset generator 103.

Process 300 can then proceed to step 307. In step 307, computing resources 101 can be configured to receive a data model from model optimizer 107, consistent with disclosed embodiments. In some embodiments, the data model can be at least partially initialized by model optimizer 107. For example, at least some of the initial weights and offsets of a neural network model received by computing resources 101 in step 307 can be set by model optimizer 107. In various embodiments, computing resources 101 can be configured to receive at least some training parameters from model optimizer 107 (e.g., batch size, number of training batches, number of epochs, chunk size, time window, input noise dimension, or the like).

Process 300 can then proceed to step 309. In step 309, computing resources 101 can generate a trained data model using the data model received from model optimizer 107 and the synthetic dataset received from dataset generator 103. For example, computing resources 101 can be configured to train the data model received from model optimizer 107 until some training criterion is satisfied. The training criterion can be, for example, a performance criterion (e.g., a Mean Absolute Error, Root Mean Squared Error, percent good classification, and the like), a convergence criterion (e.g., a minimum required improvement of a performance criterion over iterations or over time, a minimum required change in model parameters over iterations or over time), elapsed time or number of iterations, or the like. In some embodiments, the performance criterion can be a threshold value for a similarity metric or prediction accuracy metric as described herein. Satisfaction of the training criterion can be determined by one or more of computing resources 101 and model optimizer 107. In some embodiments, computing resources 101 can be configured to update model optimizer 107 regarding the training status of the data model. For example, computing resources 101 can be configured to provide the current parameters of the data model and/or current performance criteria of the data model. In some embodiments, model optimizer 107 can be configured to stop the training of the data model by computing resources 101. In various embodiments, model optimizer 107 can be configured to retrieve the data model from computing resources 101. In some embodiments, computing resources 101 can be configured to stop training the data model and provide the trained data model to model optimizer 107.

Figure 4:
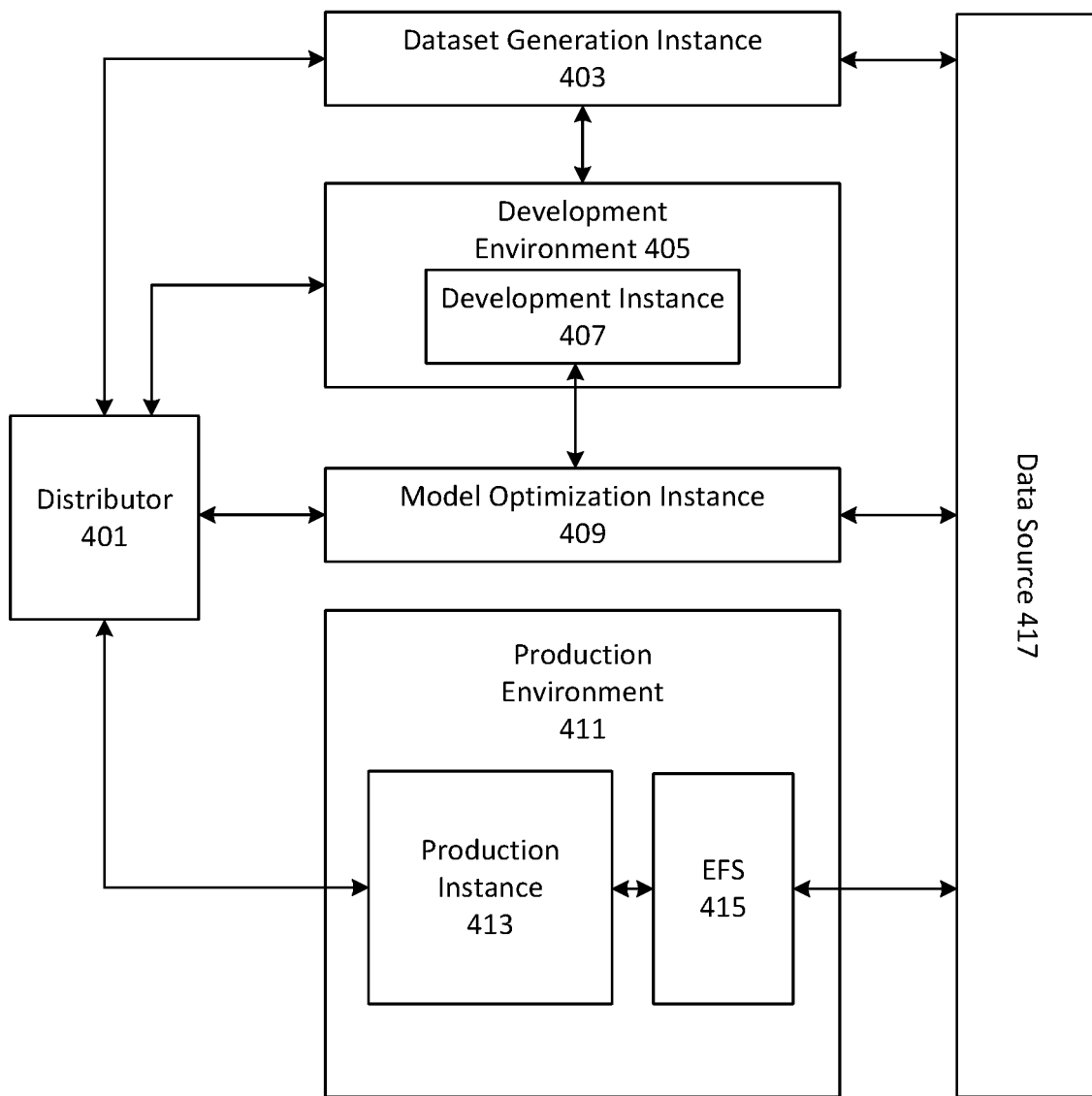
FIG. 4 depicts an exemplary implementation of the cloud-computing environment of FIG. 1, consistent with disclosed embodiments.

FIG. 4 depicts a specific implementation (system 400) of system 100 of FIG. 1. As shown in FIG. 4, the functionality of system 100 can be divided between a distributor 401, a dataset generation instance 403, a development environment 405, a model optimization instance 409, and a production environment 411. In this manner, system 100 can be implemented in a stable and scalable fashion using a distributed computing environment, such as a public cloud-computing environment, a private cloud computing environment, a hybrid cloud computing environment, a computing cluster or grid, or the like. As present computing requirements increase for a component of system 400 (e.g., as production environment 411 is called upon to instantiate additional production instances to address requests for additional synthetic data streams), additional physical or virtual machines can be recruited to that component. In some embodiments, dataset generator 103 and model optimizer 107 can be hosted by separate virtual computing instances of the cloud computing system.

Distributor 401 can be configured to provide, consistent with disclosed embodiments, an interface between the components of system 400, and between the components of system 400 and other systems. In some embodiments, distributor 401 can be configured to implement interface 113 and a load balancer. Distributor 401 can be configured to route messages between computing resources 101 (e.g., implemented on one or more of development environment 405 and production environment 411), dataset generator 103 (e.g., implemented on dataset generator instance 403), and model optimizer 107 (e.g., implemented on model optimization instance 409). The messages can include data and instructions. For example, the messages can include model generation requests and trained models provided in response to model generation requests. As an additional example, the messages can include synthetic data sets or synthetic data streams. Consistent with disclosed embodiments, distributor 401 can be implemented using one or more EC2 clusters or the like.

Data generation instance 403 can be configured to generate synthetic data, consistent with disclosed embodiments. In some embodiments, data generation instance 403 can be configured to receive actual or synthetic data from data source 417. In various embodiments, data generation instance 403 can be configured to receive synthetic data models for generating the synthetic data. In some aspects, the synthetic data models can be received from another component of system 400, such as data source 417.

Development environment 405 can be configured to implement at least a portion of the functionality of computing resources 101, consistent with disclosed embodiments. For example, development environment 405 can be configured to train data models for subsequent use by other components of system 400. In some aspects, development instances (e.g., development instance 407) hosted by development environment 405 can train one or more individual data models. In some aspects, development environment 405 be configured to spin up additional development instances to train additional data models, as needed. In some aspects, a development instance can implement an application framework such as TENSORBOARD, JUPYTER and the like; as well as machine learning applications like TENSORFLOW, CUDNN, KERAS, and the like. Consistent with disclosed embodiments, these application frameworks and applications can enable the specification and training of data models. In various aspects, development environment 405 can be implemented using one or more EC2 clusters or the like.

Model optimization instance 409 can be configured to manage training and provision of data models by system 400. In some aspects, model optimization instance 409 can be configured to provide the functionality of model optimizer 107. For example, model optimization instance 409 can be configured to provide training parameters and at least partially initialized data models to development environment 405. This selection can be based on model performance feedback received from development environment 405. As an additional example, model optimization instance 409 can be configured to determine whether a data model satisfies performance criteria. In some aspects, model optimization instance 409 can be configured to provide trained models and descriptive information concerning the trained models to another component of system 400. In various aspects, model optimization instance 409 can be implemented using one or more EC2 clusters or the like.

Production environment 405 can be configured to implement at least a portion of the functionality of computing resources 101, consistent with disclosed embodiments. For example, production environment 405 can be configured to use previously trained data models to process data received by system 400. In some aspects, a production instance (e.g., production instance 413) hosted by development environment 411 can be configured to process data using a previously trained data model. In some aspects, the production instance can implement an application framework such as TENSORBOARD, JUPYTER and the like; as well as machine learning applications like TENSORFLOW, CUDNN, KERAS, and the like. Consistent with disclosed embodiments, these application frameworks and applications can enable processing of data using data models. In various aspects, development environment 405 can be implemented using one or more EC2 clusters or the like.

A component of system 400 (e.g., model optimization instance 409) can determine the data model and data source for a production instance according to the purpose of the data processing. For example, system 400 can configure a production instance to produce synthetic data for consumption by other systems. In this example, the production instance can then provide synthetic data for testing another application. As a further example, system 400 can configure a production instance to generate outputs using actual data. For example, system 400 can configure a production instance with a data model for detecting fraudulent transactions. The production instance can then receive a stream of financial transaction data and identify potentially fraudulent transactions. In some aspects, this data model may have been trained by system 400 using synthetic data created to resemble the stream of financial transaction data. System 400 can be configured to provide an indication of the potentially fraudulent transactions to another system configured to take appropriate action (e.g., reversing the transaction, contacting one or more of the parties to the transaction, or the like).

Production environment 411 can be configured to host a file system 415 for interfacing between one or more production instances and data source 417. For example, data source 417 can be configured to store data in file system 415, while the one or more production instances can be configured to retrieve the stored data from file system 415 for processing. In some embodiments, file system 415 can be configured to scale as needed. In various embodiments, file system 415 can be configured to support parallel access by data source 417 and the one or more production instances. For example, file system 415 can be an instance of AMAZON ELASTIC FILE SYSTEM (EFS) or the like.

Data source 417 can be configured to provide data to other components of system 400. In some embodiments, data source 417 can include sources of actual data, such as streams of transaction data, human resources data, web log data, web security data, web protocols data, or system logs data. System 400 can also be configured to implement model storage 109 using a database (not shown) accessible to at least one other component of system 400 (e.g., distributor 401, dataset generation instance 403, development environment 405, model optimization instance 409, or production environment 411). In some aspects, the database can be an s3 bucket, relational database, or the like.

Figure 5A:
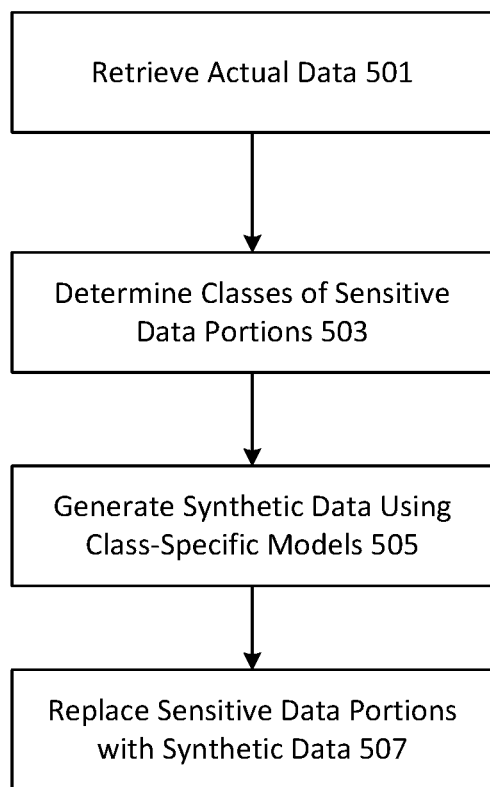
FIG. 5A depicts an exemplary process for generating synthetic data using class-specific models, consistent with disclosed embodiments.

FIG. 5A depicts process 500 for generating synthetic data using class-specific models, consistent with disclosed embodiments. System 100, or a similar system, may be configured to use such synthetic data in training a data model for use in another application (e.g., a fraud detection application). Process 500 can include the steps of retrieving actual data, determining classes of sensitive portions of the data, generating synthetic data using a data model for the appropriate class, and replacing the sensitive data portions with the synthetic data portions. In some embodiments, the data model can be a generative adversarial network trained to generate synthetic data satisfying a similarity criterion, as described herein. By using class-specific models, process 500 can generate better synthetic data that more accurately models the underlying actual data than randomly generated training data that lacks the latent structures present in the actual data. Because the synthetic data more accurately models the underlying actual data, a data model trained using this improved synthetic data may perform better processing the actual data.

Process 500 can then proceed to step 501. In step 501, dataset generator 103 can be configured to retrieve actual data. As a non-limiting example, the actual data may have been gathered during the course of ordinary business operations, marketing operations, research operations, or the like. Dataset generator 103 can be configured to retrieve the actual data from database 105 or from another system. The actual data may have been purchased in whole or in part by an entity associated with system 100. As would be understood from this description, the source and composition of the actual data is not intended to be limiting.

Process 500 can then proceed to step 503. In step 503, dataset generator 103 can be configured to determine classes of the sensitive portions of the actual data. As a non-limiting example, when the actual data is account transaction data, classes could include account numbers and merchant names. As an additional non-limiting example, when the actual data is personnel records, classes could include employee identification numbers, employee names, employee addresses, contact information, marital or beneficiary information, title and salary information, and employment actions. Consistent with disclosed embodiments, dataset generator 103 can be configured with a classifier for distinguishing different classes of sensitive information. In some embodiments, dataset generator 103 can be configured with a recurrent neural network for distinguishing different classes of sensitive information. Dataset generator 103 can be configured to apply the classifier to the actual data to determine that a sensitive portion of the training dataset belongs to the data class. For example, when the data stream includes the text string "Lorem ipsum 012-34-5678 dolor sit amet," the classifier may be configured to indicate that positions 13-23 of the text string include a potential social security number. Though described with reference to character string substitutions, the disclosed systems and methods are not so limited. As a non-limiting example, the actual data can include unstructured data (e.g., character strings, tokens, and the like) and structured data (e.g., key-value pairs, relational database files, spreadsheets, and the like).

Process 500 can then proceed to step 505. In step 505, dataset generator 103 can be configured to generate a synthetic portion using a class-specific model. To continue the previous example, dataset generator 103 can generate a synthetic social security number using a synthetic data model trained to generate social security numbers. In some embodiments, this class-specific synthetic data model can be trained to generate synthetic portions similar to those appearing in the actual data. For example, as social security numbers include an area number indicating geographic information and a group number indicating date-dependent information, the range of social security numbers present in an actual dataset can depend on the geographic origin and purpose of that dataset. A dataset of social security numbers for elementary school children in a particular school district may exhibit different characteristics than a dataset of social security numbers for employees of a national corporation. To continue the previous example, the social security-specific synthetic data model could generate the synthetic portion "03-74-3285."

Process 500 can then proceed to step 507. In step 507, dataset generator 103 can be configured to replace the sensitive portion of the actual data with the synthetic portion. To continue the previous example, dataset generator 103 could be configured to replace the characters at positions 13-23 of the text string with the values "013-74-3285," creating the synthetic text string "Lorem ipsum 013-74-3285 dolor sit amet." This text string can now be distributed without disclosing the sensitive information originally present. But this text string can still be used to train models that make valid inferences regarding the actual data, because synthetic social security numbers generated by the synthetic data model share the statistical characteristic of the actual data.

Figure 5B:
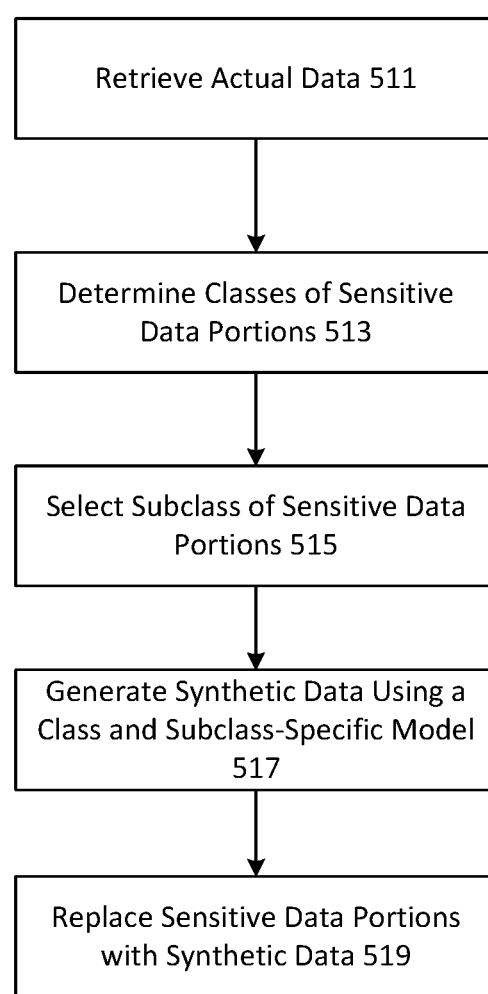
FIG. 5B depicts an exemplary process for generating synthetic data using class and subclass-specific models, consistent with disclosed embodiments.

FIG. 5B depicts a process 510 for generating synthetic data using class and subclass-specific models, consistent with disclosed embodiments. Process 510 can include the steps of retrieving actual data, determining classes of sensitive portions of the data, selecting types for synthetic data used to replace the sensitive portions of the actual data, generating synthetic data using a data model for the appropriate type and class, and replacing the sensitive data portions with the synthetic data portions. In some embodiments, the data model can be a generative adversarial network trained to generate synthetic data satisfying a similarity criterion, as described herein. This improvement addresses a problem with synthetic data generation, that a synthetic data model may fail to generate examples of proportionately rare data subclasses. For example, when data can be classified into two distinct subclasses, with a second subclass far less prevalent in the data than a first subclass, a model of the synthetic data may generate only examples of the most common first data subclasses. The synthetic data model effectively focuses on generating the best examples of the most common data subclasses, rather than acceptable examples of all the data subclasses. Process 510 addresses this problem by expressly selecting subclasses of the synthetic data class according to a distribution model based on the actual data.

Process 510 can then proceed through step 511 and step 513, which resemble step 501 and step 503 in process 500. In step 511, dataset generator 103 can be configured to receive actual data. In step 513, dataset generator can be configured to determine classes of sensitive portions of the actual data. In a non-limiting example, dataset generator 103 can be configured to determine that a sensitive portion of the data may contain a financial service account number. Dataset generator 103 can be configured to identify this sensitive portion of the data as a financial service account number using a classifier, which may in some embodiments be a recurrent neural network (which may include LSTM units).

Process 510 can then proceed to step 515. In step 515, dataset generator 103 can be configured to select a subclass for generating the synthetic data. In some aspects, this selection is not governed by the subclass of the identified sensitive portion. For example, in some embodiments the classifier that identifies the class need not be sufficiently discerning to identify the subclass, relaxing the requirements on the classifier. Instead, this selection is based on a distribution model. For example, dataset generator 103 can be configured with a statistical distribution of subclasses (e.g., a univariate distribution of subclasses) for that class and can select one of the subclasses for generating the synthetic data according to the statistical distribution. To continue the previous example, individual accounts and trust accounts may both be financial service account numbers, but the values of these accounts numbers may differ between individual accounts and trust accounts. Furthermore, there may be 19 individual accounts for every 1 trust account. In this example, dataset generator 103 can be configured to select the trust account subclass 1 time in 20, and use a synthetic data model for financial service account numbers for trust accounts to generate the synthetic data. As a further example, dataset generator 103 can be configured with a recurrent neural network that estimates the next subclass based on the current and previous subclasses. For example, healthcare records can include cancer diagnosis stage as sensitive data. Most cancer diagnosis stage values may be "no cancer" and the value of "stage 1" may be rare, but when present in a patient record this value may be followed by "stage 2," etc. The recurrent neural network can be trained on the actual healthcare records to use prior and cancer diagnosis stage values when selecting the subclass. For example, when generating a synthetic healthcare record, the recurrent neural network can be configured to use the previously selected cancer diagnosis stage subclass in selecting the present cancer diagnosis stage subclass. In this manner, the synthetic healthcare record can exhibit an appropriate progression of patient health that matches the progression in the actual data.

Process 510 can then proceed to step 517. In step 517, which resembles step 505, dataset generator 103 can be configured to generate synthetic data using a class and subclass specific model. To continue the previous financial service account number example, dataset generator 103 can be configured to use a synthetic data for trust account financial service account numbers to generate the synthetic financial server account number.

Process 510 can then proceed to step 519. In step 519, which resembles step 507, dataset generator 103 can be configured to replace the sensitive portion of the actual data with the generated synthetic data. For example, dataset generator 103 can be configured to replace the financial service account number in the actual data with the synthetic trust account financial service account number.

Figure 6:
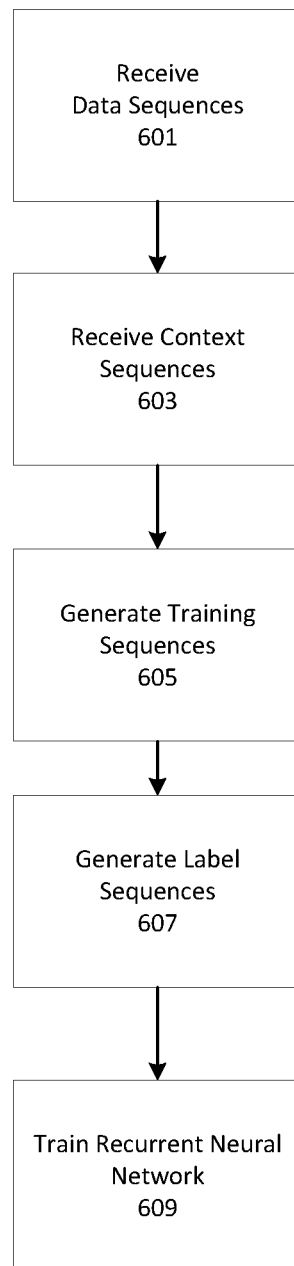
FIG. 6 depicts an exemplary process for training a classifier for generation of synthetic data, consistent with disclosed embodiments.

FIG. 6 depicts a process 600 for training a classifier for generation of synthetic data. In some embodiments, such a classifier could be used by dataset generator 103 to classify sensitive data portions of actual data, as described above with regards to FIGS. 5A and 5B. Process 600 can include the steps of receiving data sequences, receiving content sequences, generating training sequences, generating label sequences, and training a classifier using the training sequences and the label sequences. By using known data sequences and content sequences unlikely to contain sensitive data, process 600 can be used to automatically generate a corpus of labeled training data. Process 600 can be performed by a component of system 100, such as dataset generator 103 or model optimizer 107.

Process 600 can then proceed to step 601. In step 601, system 100 can receive training data sequences. The training data sequences can be received from a dataset. The dataset providing the training data sequences can be a component of system 100 (e.g., database 105) or a component of another system. The data sequences can include multiple classes of sensitive data. As a non-limiting example, the data sequences can include account numbers, social security numbers, and full names.

Process 600 can then proceed to step 603. In step 603, system 100 can receive context sequences. The context sequences can be received from a dataset. The dataset providing the context sequences can be a component of system 100 (e.g., database 105) or a component of another system. In various embodiments, the context sequences can be drawn from a corpus of pre-existing data, such as an open-source text dataset (e.g., Yelp Open Dataset or the like). In some aspects, the context sequences can be snippets of this pre-existing data, such as a sentence or paragraph of the pre-existing data.

Process 600 can then proceed to step 605. In step 605, system 100 can generate training sequences. In some embodiments, system 100 can be configured to generate a training sequence by inserting a data sequence into a context sequence. The data sequence can be inserted into the context sequence without replacement of elements of the context sequence or with replacement of elements of the context sequence. The data sequence can be inserted into the context sequence between elements (e.g., at a whitespace character, tab, semicolon, html closing tag, or other semantic breakpoint) or without regard to the semantics of the context sequence. For example, when the context sequence is "Lorem ipsum dolor sit amet, consectetur adipiscing elit, sed do eiusmod" and the data sequence is "013-74-3285," the training sequence can be "Lorem ipsum dolor sit amet, 013-74-3285 consectetur adipiscing elit, sed do eiusmod," "Lorem ipsum dolor sit amet, 013-74-3285 adipiscing elit, sed do eiusmod," or "Lorem ipsum dolor sit amet, conse013-74-3285ctetur adipiscing elit, sed do eiusmod." In some embodiments, a training sequence can include multiple data sequences.

After step 601 and step 603, process 600 can proceed to step 607. In step 607, system 100 can generate a label sequence. In some aspects, the label sequence can indicate a position of the inserted data sequence in the training sequence. In various aspects, the label sequence can indicate the class of the data sequence. As a non-limiting example, when the training sequence is "dolor sit amet, 013-74-3285 consectetur adipiscing," the label sequence can be "0000000000000000111111111110000000000000000000 000," where the value "0" indicates that a character is not part of a sensitive data portion and the value "1" indicates that a character is part of the social security number. A different class or subclass of data sequence could include a different value specific to that class or subclass. Because system 100 creates the training sequences, system 100 can automatically create accurate labels for the training sequences.

Process 600 can then proceed to step 609. In step 609, system 100 can be configured to use the training sequences and the label sequences to train a classifier. In some aspects, the label sequences can provide a "ground truth" for training a classifier using supervised learning. In some embodiments, the classifier can be a recurrent neural network (which may include LSTM units). The recurrent neural network can be configured to predict whether a character of a training sequence is part of a sensitive data portion. This prediction can be checked against the label sequence to generate an update to the weights and offsets of the recurrent neural network. This update can then be propagated through the recurrent neural network, according to methods described in "Training Recurrent Neural Networks," 2013, by Ilya Sutskever, which is incorporated herein by reference in its entirety.

Figure 7:
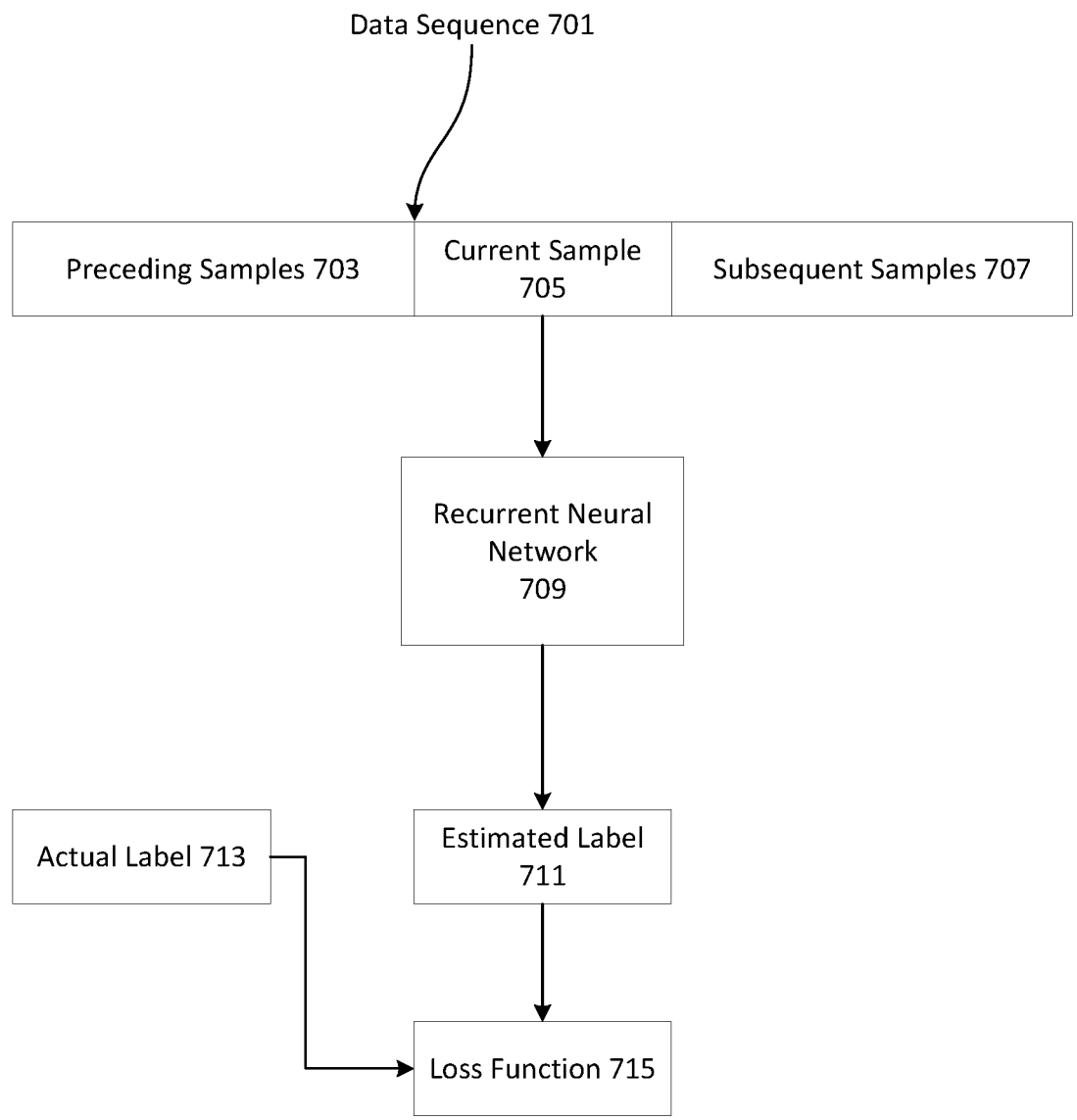
FIG. 7 depicts an exemplary process for training a classifier for generation of synthetic data, consistent with disclosed embodiments.

FIG. 7 depicts a process 700 for training a classifier for generation of synthetic data, consistent with disclosed embodiments. According to process 700, a data sequence 701 can include preceding samples 703, current sample 705, and subsequent samples 707. In some embodiments, data sequence 701 can be a subset of a training sequence, as described above with regard to FIG. 6. Data sequence 701 may be applied to recurrent neural network 709. In some embodiments, neural network 709 can be configured to estimate whether current sample 705 is part of a sensitive data portion of data sequence 701 based on the values of preceding samples 703, current sample 705, and subsequent samples 707. In some embodiments, preceding samples 703 can include between 1 and 100 samples, for example between 25 and 75 samples. In various embodiments, subsequent samples 707 can include between 1 and 100 samples, for example between 25 and 75 samples. In some embodiments, the preceding samples 703 and the subsequent samples 707 can be paired and provided to recurrent neural network 709 together. For example, in a first iteration, the first sample of preceding samples 703 and the last sample of subsequent samples 707 can be provided to recurrent neural network 709. In the next iteration, the second sample of preceding samples 703 and the second-to-last sample of subsequent samples 707 can be provided to recurrent neural network 709. System 100 can continue to provide samples to recurrent neural network 709 until all of preceding samples 703 and subsequent samples 707 have been input to recurrent neural network 709. System 100 can then provide current sample 705 to recurrent neural network 709. The output of recurrent neural network 709 after the input of current sample 705 can be estimated label 711. Estimated label 711 can be the inferred class or subclass of current sample 705, given data sequence 701 as input. In some embodiments, estimated label 711 can be compared to actual label 713 to calculate a loss function. Actual label 713 can correspond to data sequence 701. For example, when data sequence 701 is a subset of a training sequence, actual label 713 can be an element of the label sequence corresponding to the training sequence. In some embodiments, actual label 713 can occupy the same position in the label sequence as occupied by current sample 705 in the training sequence. Consistent with disclosed embodiments, system 100 can be configured to update recurrent neural network 709 using loss function 715 based on a result of the comparison.

Figure 8:
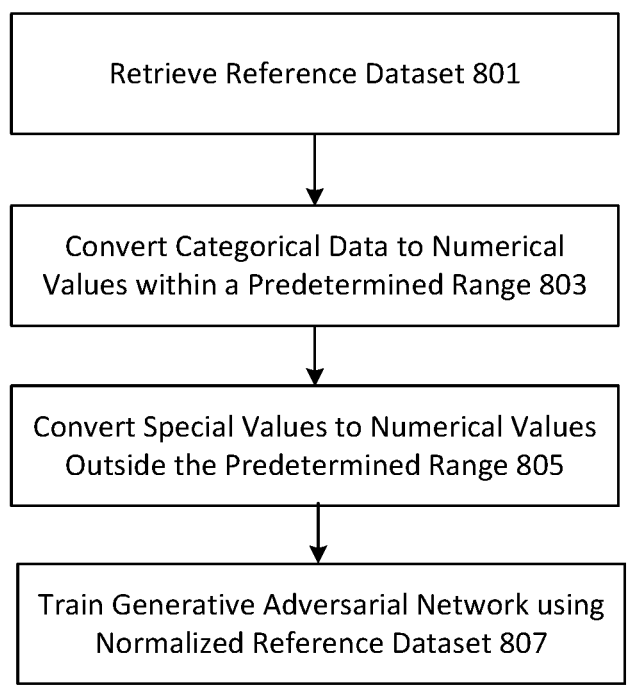
FIG. 8 depicts an exemplary process for training a generative adversarial using a normalized reference dataset, consistent with disclosed embodiments.

FIG. 8 depicts a process 800 for training a generative adversarial network using a normalized reference dataset. In some embodiments, the generative adversarial network can be used by system 100 (e.g., by dataset generator 103) to generate synthetic data (e.g., as described above with regards to FIGS. 2, 3, 5A and 5B). The generative adversarial network can include a generator network and a discriminator network. The generator network can be configured to learn a mapping from a sample space (e.g., a random number or vector) to a data space (e.g. the values of the sensitive data). The discriminator can be configured to determine, when presented with either an actual data sample or a sample of synthetic data generated by the generator network, whether the sample was generated by the generator network or was a sample of actual data. As training progresses, the generator can improve at generating the synthetic data and the discriminator can improve at determining whether a sample is actual or synthetic data. In this manner, a generator can be automatically trained to generate synthetic data similar to the actual data. However, a generative adversarial network can be limited by the actual data. For example, an unmodified generative adversarial network may be unsuitable for use with categorical data or data including missing values, not-a-numbers, or the like. For example, the generative adversarial network may not know how to interpret such data. Disclosed embodiments address this technical problem by at least one of normalizing categorical data or replacing missing values with supra-normal values.

Process 800 can then proceed to step 801. In step 801, system 100 (e.g., dataset generator 103) can retrieve a reference dataset from a database (e.g., database 105). The reference dataset can include categorical data. For example, the reference dataset can include spreadsheets or relational databases with categorical-valued data columns. As a further example, the reference dataset can include missing values, not-a-number values, or the like.

Process 800 can then proceed to step 803. In step 803, system 100 (e.g., dataset generator 103) can generate a normalized training dataset by normalizing the reference dataset. For example, system 100 can be configured to normalize categorical data contained in the reference dataset. In some embodiments, system 100 can be configured to normalize the categorical data by converting this data to numerical values. The numerical values can lie within a predetermined range. In some embodiments, the predetermined range can be zero to one. For example, given a column of categorical data including the days of the week, system 100 can be configured to map these days to values between zero and one. In some embodiments, system 100 can be configured to normalize numerical data in the reference dataset as well, mapping the values of the numerical data to a predetermined range.

Process 800 can then proceed to step 805. In step 805, system 100 (e.g., dataset generator 103) can generate the normalized training dataset by converting special values to values outside the predetermined range. For example, system 100 can be configured to assign missing values a first numerical value outside the predetermined range. As an additional example, system 100 can be configured to assign not-a-number values to a second numerical value outside the predetermined range. In some embodiments, the first value and the second value can differ. For example, system 100 can be configured to map the categorical values and the numerical values to the range of zero to one. In some embodiments, system 100 can then map missing values to the numerical value 1.5. In various embodiments, system 100 can then map not-a-number values to the numerical value of −0.5. In this manner system 100 can preserve information about the actual data while enabling training of the generative adversarial network.

Process 800 can then proceed to step 807. In step 807, system 100 (e.g., dataset generator 103) can train the generative network using the normalized dataset, consistent with disclosed embodiments.

Figure 9:
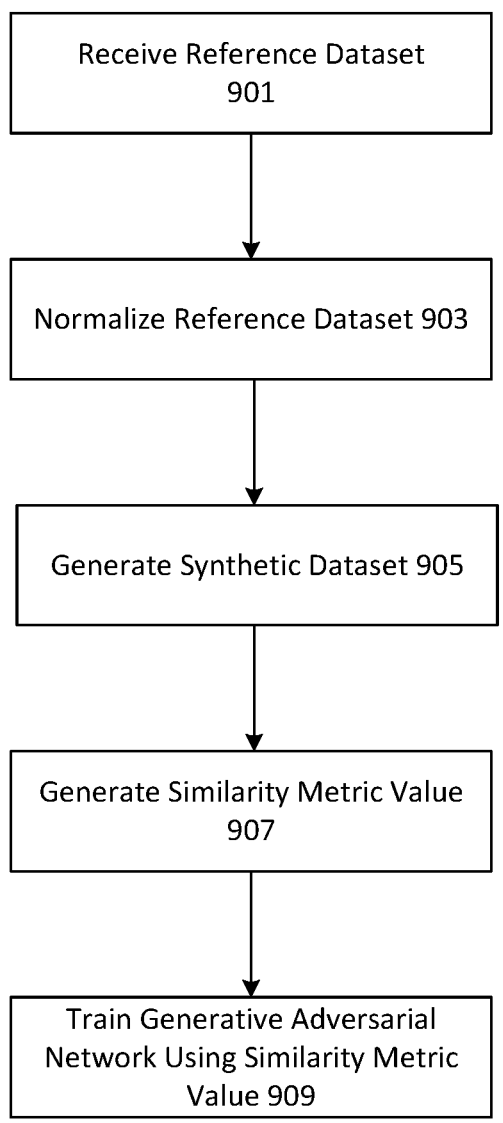
FIG. 9 depicts an exemplary process for training a generative adversarial network using a loss function configured to ensure a predetermined degree of similarity, consistent with disclosed embodiments.

FIG. 9 depicts a process 900 for training a generative adversarial network using a loss function configured to ensure a predetermined degree of similarity, consistent with disclosed embodiments. System 100 can be configured to use process 900 to generate synthetic data that is similar, but not too similar to the actual data, as the actual data can include sensitive personal information. For example, when the actual data includes social security numbers or account numbers, the synthetic data would preferably not simply recreate these numbers. Instead, system 100 would preferably create synthetic data that resembles the actual data, as described below, while reducing the likelihood of overlapping values. To address this technical problem, system 100 can be configured to determine a similarity metric value between the synthetic dataset and the normalized reference dataset, consistent with disclosed embodiments. System 100 can be configured to use the similarity metric value to update a loss function for training the generative adversarial network. In this manner, system 100 can be configured to determine a synthetic dataset differing in value from the normalized reference dataset at least a predetermined amount according to the similarity metric.

While described below with regard to training a synthetic data model, dataset generator 103 can be configured to use such trained synthetic data models to generate synthetic data (e.g., as described above with regards to FIGS. 2 and 3). For example, development instances (e.g., development instance 407) and production instances (e.g., production instance 413) can be configured to generate data similar to a reference dataset according to the disclosed systems and methods.

Process 900 can then proceed to step 901, which can resemble step 801. In step 901, system 100 (e.g., model optimizer 107, computational resources 101, or the like) can receive a reference dataset. In some embodiments, system 100 can be configured to receive the reference dataset from a database (e.g., database 105). The reference dataset can include categorical and/or numerical data. For example, the reference dataset can include spreadsheet or relational database data. In some embodiments, the reference dataset can include special values, such as missing values, not-a-number values, or the like.

Process 900 can then proceed to step 903. In step 903, system 100 (e.g., dataset generator 103, model optimizer 107, computational resources 101, or the like) can be configured to normalize the reference dataset. In some instances, system 100 can be configured to normalize the reference dataset as described above with regard to steps 803 and 805 of process 800. For example, system 100 can be configured to normalize the categorical data and/or the numerical data in the reference dataset to a predetermined range. In some embodiments, system 100 can be configured to replace special values with numerical values outside the predetermined range.

Process 900 can then proceed to step 905. In step 905, system 100 (e.g., model optimizer 107, computational resources 101, or the like) can generate a synthetic training dataset using the generative network. For example, system 100 can apply one or more random samples to the generative network to generate one or more synthetic data items. In some instances, system 100 can be configured to generate between 200 and 400,000 data items, or preferably between 20,000 and 40,000 data items.

Process 900 can then proceed to step 907. In step 907, system 100 (e.g., model optimizer 107, computational resources 101, or the like) can determine a similarity metric value using the normalized reference dataset and the synthetic training dataset. System 100 can be configured to generate the similarity metric value according to a similarity metric. In some aspects, the similarity metric value can include at least one of a statistical correlation score (e.g., a score dependent on the covariances or univariate distributions of the synthetic data and the normalized reference dataset), a data similarity score (e.g., a score dependent on a number of matching or similar elements in the synthetic dataset and normalized reference dataset), or data quality score (e.g., a score dependent on at least one of a number of duplicate elements in each of the synthetic dataset and normalized reference dataset, a prevalence of the most common value in each of the synthetic dataset and normalized reference dataset, a maximum difference of rare values in each of the synthetic dataset and normalized reference dataset, the differences in schema between the synthetic dataset and normalized reference dataset, or the like). System 100 can be configured to calculate these scores using the synthetic dataset and a reference dataset.

In some aspects, the similarity metric can depend on a covariance of the synthetic dataset and a covariance of the normalized reference dataset. For example, in some embodiments, system 100 can be configured to generate a difference matrix using a covariance matrix of the normalized reference dataset and a covariance matrix of the synthetic dataset. As a further example, the difference matrix can be the difference between the covariance matrix of the normalized reference dataset and the covariance matrix of the synthetic dataset. The similarity metric can depend on the difference matrix. In some aspects, the similarity metric can depend on the summation of the squared values of the difference matrix. This summation can be normalized, for example by the square root of the product of the number of rows and number of columns of the covariance matrix for the normalized reference dataset.

In some embodiments, the similarity metric can depend on a univariate value distribution of an element of the synthetic dataset and a univariate value distribution of an element of the normalized reference dataset. For example, for corresponding elements of the synthetic dataset and the normalized reference dataset, system 100 can be configured to generate histograms having the same bins. For each bin, system 100 can be configured to determine a difference between the value of the bin for the synthetic data histogram and the value of the bin for the normalized reference dataset histogram. In some embodiments, the values of the bins can be normalized by the total number of datapoints in the histograms. For each of the corresponding elements, system 100 can be configured to determine a value (e.g., a maximum difference, an average difference, a Euclidean distance, or the like) of these differences. In some embodiments, the similarity metric can depend on a function of this value (e.g., a maximum, average, or the like) across the common elements. For example, the normalized reference dataset can include multiple columns of data. The synthetic dataset can include corresponding columns of data. The normalized reference dataset and the synthetic dataset can include the same number of rows. System 100 can be configured to generate histograms for each column of data for each of the normalized reference dataset and the synthetic dataset. For each bin, system 100 can determine the difference between the count of datapoints in the normalized reference dataset histogram and the synthetic dataset histogram. System 100 can determine the value for this column to be the maximum of the differences for each bin. System 100 can determine the value for the similarity metric to be the average of the values for the columns. As would be appreciated by one of skill in the art, this example is not intended to be limiting.

In various embodiments, the similarity metric can depend on a number of elements of the synthetic dataset that match elements of the reference dataset. In some embodiments, the matching can be an exact match, with the value of an element in the synthetic dataset matching the value of an element in the normalized reference dataset. As a nonlimiting example, when the normalized reference dataset includes a spreadsheet having rows and columns, and the synthetic dataset includes a spreadsheet having rows and corresponding columns, the similarity metric can depend on the number of rows of the synthetic dataset that have the same values as rows of the normalized reference dataset. In some embodiments, the normalized reference dataset and synthetic dataset can have duplicate rows removed prior to performing this comparison. System 100 can be configured to merge the non-duplicate normalized reference dataset and non-duplicate synthetic dataset by all columns. In this non-limiting example, the size of the resulting dataset will be the number of exactly matching rows. In some embodiments, system 100 can be configured to disregard columns that appear in one dataset but not the other when performing this comparison.

In various embodiments, the similarity metric can depend on a number of elements of the synthetic dataset that are similar to elements of the normalized reference dataset. System 100 can be configured to calculate similarity between an element of the synthetic dataset and an element of the normalized reference dataset according to distance measure. In some embodiments, the distance measure can depend on a Euclidean distance between the elements. For example, when the synthetic dataset and the normalized reference dataset include rows and columns, the distance measure can depend on a Euclidean distance between a row of the synthetic dataset and a row of the normalized reference dataset. In various embodiments, when comparing a synthetic dataset to an actual dataset including categorical data (e.g., a reference dataset that has not been normalized), the distance measure can depend on a Euclidean distance between numerical row elements and a Hamming distance between non-numerical row elements. The Hamming distance can depend on a count of non-numerical elements differing between the row of the synthetic dataset and the row of the actual dataset. In some embodiments, the distance measure can be a weighted average of the Euclidean distance and the Hamming distance. In some embodiments, system 100 can be configured to disregard columns that appear in one dataset but not the other when performing this comparison. In various embodiments, system 100 can be configured to remove duplicate entries from the synthetic dataset and the normalized reference dataset before performing the comparison.

In some embodiments, system 100 can be configured to calculate a distance measure between each row of the synthetic dataset (or a subset of the rows of the synthetic dataset) and each row of the normalized reference dataset (or a subset of the rows of the normalized reference dataset). System 100 can then determine the minimum distance value for each row of the synthetic dataset across all rows of the normalized reference dataset. In some embodiments, the similarity metric can depend on a function of the minimum distance values for all rows of the synthetic dataset (e.g., a maximum value, an average value, or the like).

In some embodiments, the similarity metric can depend on a frequency of duplicate elements in the synthetic dataset and the normalized reference dataset. In some aspects, system 100 can be configured to determine the number of duplicate elements in each of the synthetic dataset and the normalized reference dataset. In various aspects, system 100 can be configured to determine the proportion of each dataset represented by at least some of the elements in each dataset. For example, system 100 can be configured to determine the proportion of the synthetic dataset having a particular value. In some aspects, this value may be the most frequent value in the synthetic dataset. System 100 can be configured to similarly determine the proportion of the normalized reference dataset having a particular value (e.g., the most frequent value in the normalized reference dataset).

In some embodiments, the similarity metric can depend on a relative prevalence of rare values in the synthetic and normalized reference dataset. In some aspects, such rare values can be those present in a dataset with frequencies less than a predetermined threshold. In some embodiments, the predetermined threshold can be a value less than 20%, for example 10%. System 100 can be configured to determine a prevalence of rare values in the synthetic and normalized reference dataset. For example, system 100 can be configured to determine counts of the rare values in a dataset and the total number of elements in the dataset. System 100 can then determine ratios of the counts of the rare values to the total number of elements in the datasets.

In some embodiments, the similarity metric can depend on differences in the ratios between the synthetic dataset and the normalized reference dataset. As a non-limiting example, an exemplary dataset can be an access log for patient medical records that tracks the job title of the employee accessing a patient medical record. The job title "Administrator" may be a rare value of job title and appear in 3% of the log entries. System 100 can be configured to generate synthetic log data based on the actual dataset, but the job title "Administrator" may not appear in the synthetic log data. The similarity metric can depend on difference between the actual dataset prevalence (3%) and the synthetic log data prevalence (0%). As an alternative example, the job title "Administrator" may be overrepresented in the synthetic log data, appearing in 15% of the of the log entries (and therefore not a rare value in the synthetic log data when the predetermined threshold is 10%). In this example, the similarity metric can depend on difference between the actual dataset prevalence (3%) and the synthetic log data prevalence (15%).

In various embodiments, the similarity metric can depend on a function of the differences in the ratios between the synthetic dataset and the normalized reference dataset. For example, the actual dataset may include 10 rare values with a prevalence under 10% of the dataset. The difference between the prevalence of these 10 rare values in the actual dataset and the normalized reference dataset can range from −5% to 4%. In some embodiments, the similarity metric can depend on the greatest magnitude difference (e.g., the similarity metric could depend on the value −5% as the greatest magnitude difference). In various embodiments, the similarity metric can depend on the average of the magnitude differences, the Euclidean norm of the ratio differences, or the like.

In various embodiments, the similarity metric can depend on a difference in schemas between the synthetic dataset and the normalized reference dataset. For example, when the synthetic dataset includes spreadsheet data, system 100 can be configured to determine a number of mismatched columns between the synthetic and normalized reference datasets, a number of mismatched column types between the synthetic and normalized reference datasets, a number of mismatched column categories between the synthetic and normalized reference datasets, and number of mismatched numeric ranges between the synthetic and normalized reference datasets. The value of the similarity metric can depend on the number of at least one of the mismatched columns, mismatched column types, mismatched column categories, or mismatched numeric ranges.

In some embodiments, the similarity metric can depend on one or more of the above criteria. For example, the similarity metric can depend on one or more of (1) a covariance of the output data and a covariance of the normalized reference dataset, (2) a univariate value distribution of an element of the synthetic dataset, (3) a univariate value distribution of an element of the normalized reference dataset, (4) a number of elements of the synthetic dataset that match elements of the reference dataset, (5) a number of elements of the synthetic dataset that are similar to elements of the normalized reference dataset, (6) a distance measure between each row of the synthetic dataset (or a subset of the rows of the synthetic dataset) and each row of the normalized reference dataset (or a subset of the rows of the normalized reference dataset), (7) a frequency of duplicate elements in the synthetic dataset and the normalized reference dataset, (8) a relative prevalence of rare values in the synthetic and normalized reference dataset, and (9) differences in the ratios between the synthetic dataset and the normalized reference dataset.

System 100 can compare a synthetic dataset to a normalized reference dataset, a synthetic dataset to an actual (unnormalized) dataset, or to compare two datasets according to a similarity metric consistent with disclosed embodiments. For example, in some embodiments, model optimizer 107 can be configured to perform such comparisons. In various embodiments, model storage 105 can be configured to store similarity metric information (e.g., similarity values, indications of comparison datasets, and the like) together with a synthetic dataset.

Process 900 can then proceed to step 909. In step 909, system 100 (e.g., model optimizer 107, computational resources 101, or the like) can train the generative adversarial network using the similarity metric value. In some embodiments, system 100 can be configured to determine that the synthetic dataset satisfies a similarity criterion. The similarity criterion can concern at least one of the similarity metrics described above. For example, the similarity criterion can concern at least one of a statistical correlation score between the synthetic dataset and the normalized reference dataset, a data similarity score between the synthetic dataset and the reference dataset, or a data quality score for the synthetic dataset.

In some embodiments, synthetic data satisfying the similarity criterion can be too similar to the reference dataset. System 100 can be configured to update a loss function for training the generative adversarial network to decrease the similarity between the reference dataset and synthetic datasets generated by the generative adversarial network when the similarity criterion is satisfied. In particular, the loss function of the generative adversarial network can be configured to penalize generation of synthetic data that is too similar to the normalized reference dataset, up to a certain threshold. To that end, a penalty term can be added to the loss function of the generative adversarial network. This term can penalize the calculated loss if the dissimilarity between the synthetic data and the actual data goes below a certain threshold. In some aspects, this penalty term can thereby ensure that the value of the similarity metric exceeds some similarity threshold, or remains near the similarity threshold (e.g., the value of the similarity metric may exceed 90% of the value of the similarity threshold). In this non-limiting example, decreasing values of the similarity metric can indicate increasing similarity. System 100 can then update the loss function such that the likelihood of generating synthetic data like the current synthetic data is reduced. In this manner, system 100 can train the generative adversarial network using a loss function that penalizes generation of data differing from the reference dataset by less than the predetermined amount.

Figure 10:
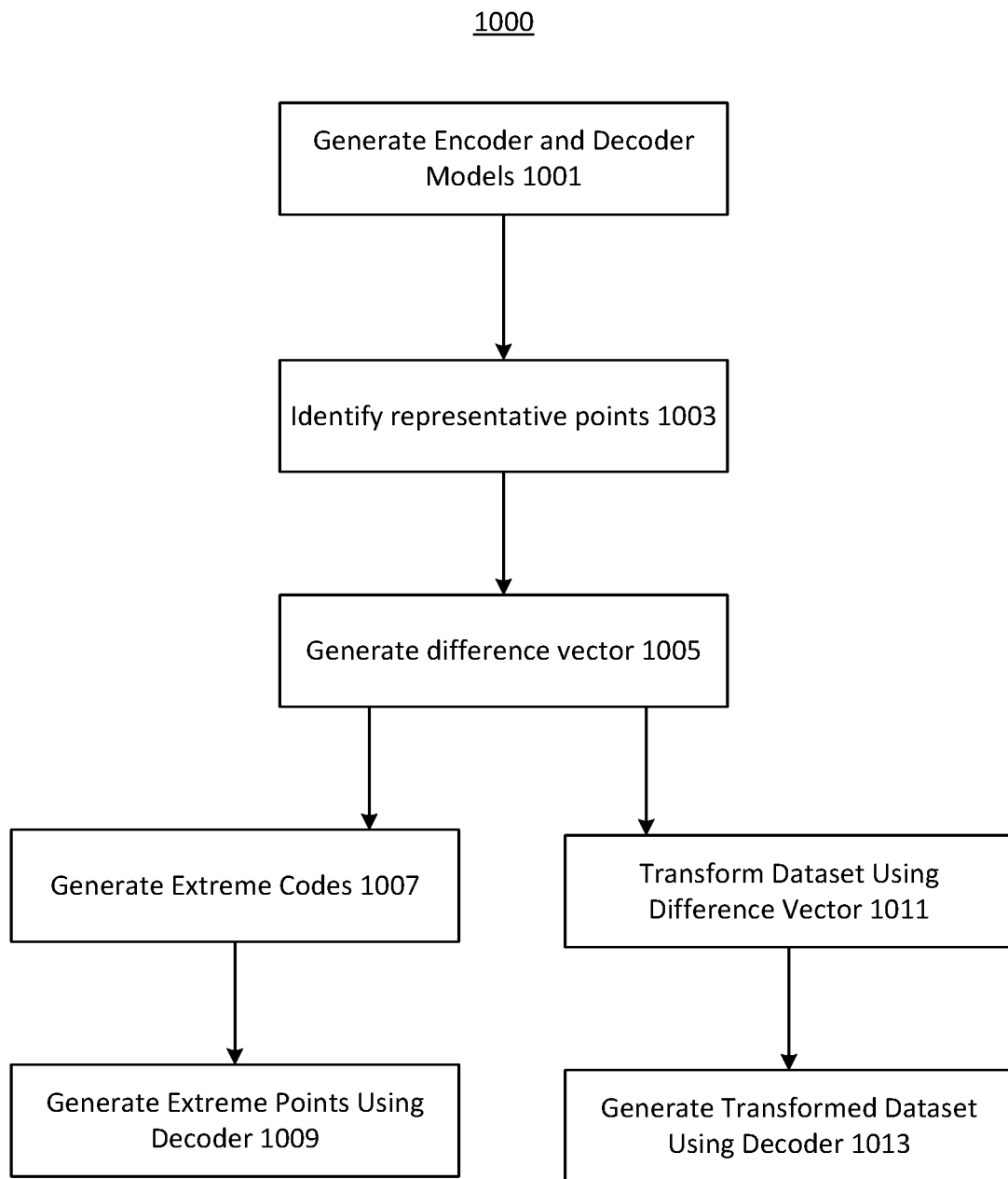
FIG. 10 depicts an exemplary process for supplementing or transform datasets using code-space operations, consistent with disclosed embodiments.

FIG. 10 depicts a process 1000 for supplementing or transforming datasets using code-space operations, consistent with disclosed embodiments. Process 1000 can include the steps of generating encoder and decoder models that map between a code space and a sample space, identifying representative points in code space, generating a difference vector in code space, and generating extreme points or transforming a dataset using the difference vector. In this manner, process 1000 can support model validation and simulation of conditions differing from those present during generation of a training dataset. For example, while existing systems and methods may train models using datasets representative of typical operating conditions, process 1000 can support model validation by inferring datapoints that occur infrequently or outside typical operating conditions. As an additional example, a training data include operations and interactions typical of a first user population. Process 1000 can support simulation of operations and interactions typical of a second user population that differs from the first user population. To continue this example, a young user population may interact with a system. Process 1000 can support generation of a synthetic training dataset representative of an older user population interacting with the system. This synthetic training dataset can be used to simulate performance of the system with an older user population, before developing that userbase.

After starting, process 1000 can proceed to step 1001. In step 1001, system 1001 can generate an encoder model and a decoder model. Consistent with disclosed embodiments, system 100 can be configured to generate an encoder model and decoder model using an adversarially learned inference model, as disclosed in "Adversarially Learned Inference" by Vincent Dumoulin, et al. According to the adversarially learned inference model, an encoder maps from a sample space to a code space and a decoder maps from a code space to a sample space. The encoder and decoder are trained by selecting either a code and generating a sample using the decoder or by selecting a sample and generating a code using the encoder. The resulting pairs of code and sample are provided to a discriminator model, which is trained to determine whether the pairs of code and sample came from the encoder or decoder. The encoder and decoder can be updated based on whether the discriminator correctly determined the origin of the samples. Thus, the encoder and decoder can be trained to fool the discriminator. When appropriately trained, the joint distribution of code and sample for the encoder and decoder match. As would be appreciated by one of skill in the art, other techniques of generating a mapping from a code space to a sample space may also be used. For example, a generative adversarial network can be used to learn a mapping from the code space to the sample space.

Process 1000 can then proceed to step 1003. In step 1003, system 100 can identify representative points in the code space. System 100 can identify representative points in the code space by identifying points in the sample space, mapping the identified points into code space, and determining the representative points based on the mapped points, consistent with disclosed embodiments. In some embodiments, the identified points in the sample space can be elements of a dataset (e.g., an actual dataset or a synthetic dataset generated using an actual dataset).

System 100 can identify points in the sample space based on sample space characteristics. For example, when the sample space includes financial account information, system 100 can be configured to identify one or more first accounts belonging to users in their 20s and one or more second accounts belonging to users in their 40s.

Consistent with disclosed embodiments, identifying representative points in the code space can include a step of mapping the one or more first points in the sample space and the one or more second points in the sample space to corresponding points in the code space. In some embodiments, the one or more first points and one or more second points can be part of a dataset. For example, the one or more first points and one or more second points can be part of an actual dataset or a synthetic dataset generated using an actual dataset.

System 100 can be configured to select first and second representative points in the code space based on the mapped one or more first points and the mapped one or more second points. As shown in FIG. 11A, when the one or more first points include a single point, the mapping of this single point to the code space (e.g., point 1101) can be a first representative point in code space 1100. Likewise, when the one or more second points include a single point, the mapping of this single point to the code space (e.g., point 1103) can be a second representative point in code space 1100.

Figure 11B:
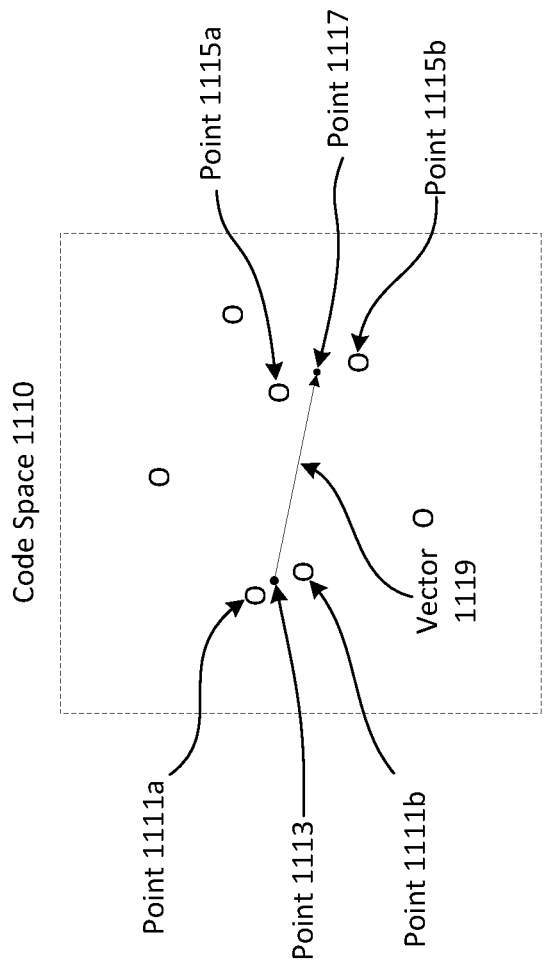
FIGS. 11A and 11B depict an exemplary illustration of points in code-space, consistent with disclosed embodiments.
Figure 11A:
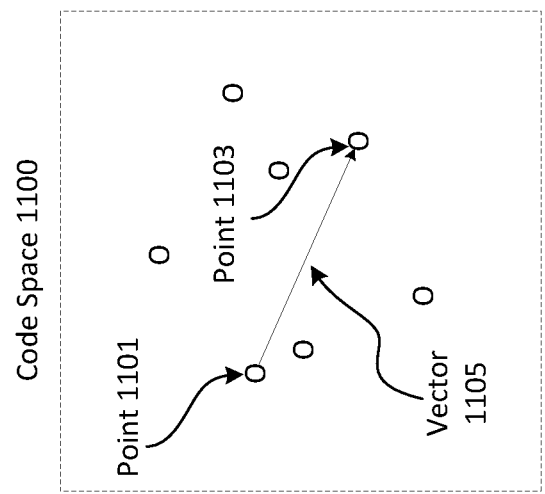

As shown in FIG. 11B, when the one or more first points include multiple points, system 100 can be configured to determine a first representative point in code space 1110. In some embodiments, system 100 can be configured to determine the first representative point based on the locations of the mapped one or more first points in the code space. In some embodiments, the first representative point can be a centroid or a medoid of the mapped one or more first points. Likewise, system 100 can be configured to determine the second representative point based on the locations of the mapped one or more second points in the code space. In some embodiments, the second representative point can be a centroid or a medoid of the mapped one or more second points. For example, system 100 can be configured to identify point 1113 as the first representative point based on the locations of mapped points 1111a and 1111b. Likewise, system 100 can be configured to identify point 1117 as the second representative point based on the locations of mapped points 1115a and 1115b.

In some embodiments, the code space can include a subset of Rn. System 100 can be configured to map a dataset to the code space using the encoder. System 100 can then identify the coordinates of the points with respect to a basis vector in Rn (e.g., one of the vectors of the identity matrix). System 100 can be configured to identify a first point with a minimum coordinate value with respect to the basis vector and a second point with a maximum coordinate value with respect to the basis vector. System 100 can be configured to identify these points as the first and second representative points. For example, taking the identity matrix as the basis, system 100 can be configured to select as the first point the point with the lowest value of the first element of the vector. To continue this example, system 100 can be configured to select as the second point the point with the highest value of the first element of the vector. In some embodiments, system 100 can be configured to repeat process 1000 for each vector in the basis.

Process 1000 can then proceed to step 1005. In step 1005, system 100 can determine a difference vector connecting the first representative point and the second representative point. For example, as shown in FIG. 11A, system 100 can be configured to determine a vector 1105 from first representative point 1101 to second representative point 1103. Likewise, as shown in FIG. 11B, system 100 can be configured to determine a vector 1119 from first representative point 1113 to second representative point 1117.

Process 1000 can then proceed to step 1007. In step 1007, as depicted in FIG. 12A, system 100 can generate extreme codes. Consistent with disclosed embodiments, system 100 can be configured to generate extreme codes by sampling the code space (e.g., code space 1200) along an extension (e.g., extension 1201) of the vector connecting the first representative point and the second representative point (e.g., vector 1105). In this manner, system 100 can generate a code extreme with respect to the first representative point and the second representative point (e.g. extreme point 1203).

Process 1000 can then proceed to step 1009. In step 1009, as depicted in FIG. 12A, system 100 can generate extreme samples. Consistent with disclosed embodiments, system 100 can be configured to generate extreme samples by converting the extreme code into the sample space using the decoder trained in step 1001. For example, system 100 can be configured to convert extreme point 1203 into a corresponding datapoint in the sample space.

Process 1000 can then proceed to step 1011. In step 1011, as depicted in FIG. 12B, system 100 can translate a dataset using the difference vector determined in step 1005 (e.g., difference vector 1105). In some aspects, system 100 can be configured to convert the dataset from sample space to code space using the encoder trained in step 1001. System 100 can be configured to then translate the elements of the dataset in code space using the difference vector. In some aspects, system 100 can be configured to translate the elements of the dataset using the vector and a scaling factor. In some aspects, the scaling factor can be less than one. In various aspects, the scaling factor can be greater than or equal to one. For example, as shown in FIG. 12B, the elements of the dataset can be translated in code space 1210 by the product of the difference vector and the scaling factor (e.g., original point 1211 can be translated by translation 1212 to translated point 1213).

Process 1000 can then proceed to step 1013. In step 1013, as depicted in FIG. 12B, system 100 can generate a translated dataset. Consistent with disclosed embodiments, system 100 can be configured to generate the translated dataset by converting the translated points into the sample space using the decoder trained in step 1001. For example, system 100 can be configured to convert extreme point translated point 1213 into a corresponding datapoint in the sample space.

Figure 13:
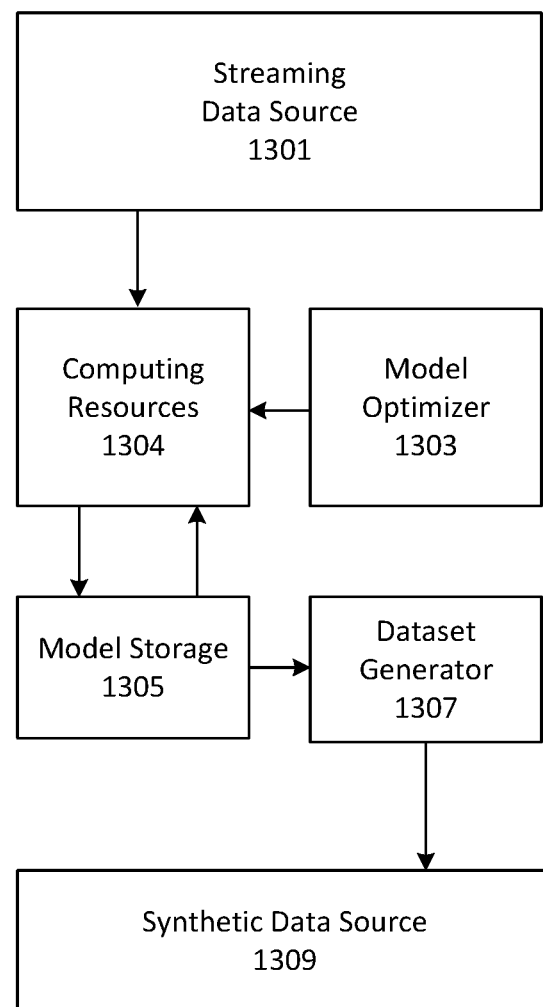
FIG. 13 depicts an exemplary cloud computing system for generating a synthetic data stream that tracks a reference data stream, consistent with disclosed embodiments.

FIG. 13 depicts an exemplary cloud computing system 1300 for generating a synthetic data stream that tracks a reference data stream. The flow rate of the synthetic data can resemble the flow rate of the reference data stream, as system 1300 can generate synthetic data in response to receiving reference data stream data. System 1300 can include a streaming data source 1301, model optimizer 1303, computing resource 1304, model storage 1305, dataset generator 1307, and synthetic data source 1309. System 1300 can be configured to generate a new synthetic data model using actual data received from streaming data source 1301. Streaming data source 1301, model optimizer 1303, computing resources 1304, and model storage 1305 can interact to generate the new synthetic data model, consistent with disclosed embodiments. In some aspects, system 1300 can be configured to generate the new synthetic data model while also generating synthetic data using a current synthetic data model.

Streaming data source 1301 can be configured to retrieve new data elements from a database, a file, a datasource, a topic in a data streaming platform (e.g., IBM STREAMS), a topic in a distributed messaging system (e.g., APACHE KAFKA), or the like. In some aspects, streaming data source 1301 can be configured to retrieve new elements in response to a request from model optimizer 1303. In some aspects, streaming data source 1301 can be configured to retrieve new data elements in real-time. For example, streaming data source 1301 can be configured to retrieve log data, as that log data is created. In various aspects, streaming data source 1301 can be configured to retrieve batches of new data. For example, streaming data source 1301 can be configured to periodically retrieve all log data created within a certain period (e.g., a five-minute interval). In some embodiments, the data can be application logs. The application logs can include event information, such as debugging information, transaction information, user information, user action information, audit information, service information, operation tracking information, process monitoring information, or the like. In some embodiments, the data can be JSON data (e.g., JSON application logs).

System 1300 can be configured to generate a new synthetic data model, consistent with disclosed embodiments. Model optimizer 1303 can be configured to provision computing resources 1304 with a data model, consistent with disclosed embodiments. In some aspects, computing resources 1304 can resemble computing resources 101, described above with regard to FIG. 1. For example, computing resources 1304 can provide similar functionality and can be similarly implemented. The data model can be a synthetic data model. The data model can be a current data model configured to generate data similar to recently received data in the reference data stream. The data model can be received from model storage 1305. For example, model optimizer 1307 can be configured to provide instructions to computing resources 1304 to retrieve a current data model of the reference data stream from model storage 1305. In some embodiments, the synthetic data model can include a recurrent neural network, a kernel density estimator, or a generative adversarial network.

Computing resources 1304 can be configured to train the new synthetic data model using reference data stream data. In some embodiments, system 1300 (e.g., computing resources 1304 or model optimizer 1303) can be configured to include reference data stream data into the training data as it is received from streaming data source 1301. The training data can therefore reflect the current characteristics of the reference data stream (e.g., the current values, current schema, current statistical properties, and the like). In some aspects, system 1300 (e.g., computing resources 1304 or model optimizer 1303) can be configured to store reference data stream data received from streaming data source 1301 for subsequent use as training data. In some embodiments, computing resources 1304 may have received the stored reference data stream data prior to beginning training of the new synthetic data model. As an additional example, computing resources 1304 (or another component of system 1300) can be configured to gather data from streaming data source 1301 during a first time-interval (e.g., the prior repeat) and use this gathered data to train a new synthetic model in a subsequent time-interval (e.g., the current repeat). In various embodiments, computing resources 1304 can be configured to use the stored reference data stream data for training the new synthetic data model. In various embodiments, the training data can include both newly-received and stored data. When the synthetic data model is a Generative Adversarial Network, computing resources 1304 can be configured to train the new synthetic data model, in some embodiments, as described above with regard to FIGS. 8 and 9. Alternatively, computing resources 1304 can be configured to train the new synthetic data model according to know methods.

Model optimizer 1303 can be configured to evaluate performance criteria of a newly created synthetic data model. In some embodiments, the performance criteria can include a similarity metric (e.g., a statistical correlation score, data similarity score, or data quality score, as described herein). For example, model optimizer 1303 can be configured to compare the covariances or univariate distributions of a synthetic dataset generated by the new synthetic data model and a reference data stream dataset. Likewise, model optimizer 1303 can be configured to evaluate the number of matching or similar elements in the synthetic dataset and reference data stream dataset. Furthermore, model optimizer 1303 can be configured to evaluate a number of duplicate elements in each of the synthetic dataset and reference data stream dataset, a prevalence of the most common value in synthetic dataset and reference data stream dataset, a maximum difference of rare values in each of the synthetic dataset and reference data stream dataset, differences in schema between the synthetic dataset and reference data stream dataset, and the like.

In various embodiments, the performance criteria can include prediction metrics. The prediction metrics can enable a user to determine whether data models perform similarly for both synthetic and actual data. The prediction metrics can include a prediction accuracy check, a prediction accuracy cross check, a regression check, a regression cross check, and a principal component analysis check. In some aspects, a prediction accuracy check can determine the accuracy of predictions made by a model (e.g., recurrent neural network, kernel density estimator, or the like) given a dataset. For example, the prediction accuracy check can receive an indication of the model, a set of data, and a set of corresponding labels. The prediction accuracy check can return an accuracy of the model in predicting the labels given the data. Similar model performance for the synthetic and original data can indicate that the synthetic data preserves the latent feature structure of the original data. In various aspects, a prediction accuracy cross check can calculate the accuracy of a predictive model that is trained on synthetic data and tested on the original data used to generate the synthetic data. In some aspects, a regression check can regress a numerical column in a dataset against other columns in the dataset, determining the predictability of the numerical column given the other columns. In some aspects, a regression error cross check can determine a regression formula for a numerical column of the synthetic data and then evaluate the predictive ability of the regression formula for the numerical column of the actual data. In various aspects, a principal component analysis check can determine a number of principal component analysis columns sufficient to capture a predetermined amount of the variance in the dataset. Similar numbers of principal component analysis columns can indicate that the synthetic data preserves the latent feature structure of the original data.

Model optimizer 1303 can be configured to store the newly created synthetic data model and metadata for the new synthetic data model in model storage 1305 based on the evaluated performance criteria, consistent with disclosed embodiments. For example, model optimizer 1303 can be configured to store the metadata and new data model in model storage when a value of a similarity metric or a prediction metric satisfies a predetermined threshold. In some embodiments, the metadata can include at least one value of a similarity metric or prediction metric. In various embodiments, the metadata can include an indication of the origin of the new synthetic data model, the data used to generate the new synthetic data model, when the new synthetic data model was generated, and the like.

System 1300 can be configured to generate synthetic data using a current data model. In some embodiments, this generation can occur while system 1300 is training a new synthetic data model. Model optimizer 1303, model storage 1305, dataset generator 1307, and synthetic data source 1309 can interact to generate the synthetic data, consistent with disclosed embodiments.

Model optimizer 1303 can be configured to receive a request for a synthetic data stream from an interface (e.g., interface 113 or the like). In some aspects, model optimizer 1307 can resemble model optimizer 107, described above with regard to FIG. 1. For example, model optimizer 1307 can provide similar functionality and can be similarly implemented. In some aspects, requests received from the interface can indicate a reference data stream. For example, such a request can identify streaming data source 1301 and/or specify a topic or subject (e.g., a Kafka topic or the like). In response to the request, model optimizer 1307 (or another component of system 1300) can be configured to direct generation of a synthetic data stream that tracks the reference data stream, consistent with disclosed embodiments.

Dataset generator 1307 can be configured to retrieve a current data model of the reference data stream from model storage 1305. In some embodiments, dataset generator 1307 can resemble dataset generator 103, described above with regard to FIG. 1. For example, dataset generator 1307 can provide similar functionality and can be similarly implemented. Likewise, in some embodiments, model storage 1305 can resemble model storage 105, described above with regard to FIG. 1. For example, model storage 1305 can provide similar functionality and can be similarly implemented. In some embodiments, the current data model can resemble data received from streaming data source 1301 according to a similarity metric (e.g., a statistical correlation score, data similarity score, or data quality score, as described herein). In various embodiments, the current data model can resemble data received during a time interval extending to the present (e.g. the present hour, the present day, the present week, or the like). In various embodiments, the current data model can resemble data received during a prior time interval (e.g. the previous hour, yesterday, last week, or the like). In some embodiments, the current data model can be the most recently trained data model of the reference data stream.

Dataset generator 1307 can be configured to generate a synthetic data stream using the current data model of the reference data steam. In some embodiments, dataset generator 1307 can be configured to generate the synthetic data stream by replacing sensitive portions of the reference data steam with synthetic data, as described in FIGS. 5A and 5B. In various embodiments, dataset generator 1307 can be configured to generate the synthetic data stream without reference to the reference data steam data. For example, when the current data model is a recurrent neural network, dataset generator 1307 can be configured to initialize the recurrent neural network with a value string (e.g., a random sequence of characters), predict a new value based on the value string, and then add the new value to the end of the value string. Dataset generator 1307 can then predict the next value using the updated value string that includes the new value. In some embodiments, rather than selecting the most likely new value, dataset generator 1307 can be configured to probabilistically choose a new value. As a nonlimiting example, when the existing value string is "examin" the dataset generator 1307 can be configured to select the next value as "e" with a first probability and select the next value as "a" with a second probability. As an additional example, when the current data model is a generative adversarial network or an adversarially learned inference network, dataset generator 1307 can be configured to generate the synthetic data by selecting samples from a code space, as described herein.

In some embodiments, dataset generator 1307 can be configured to generate an amount of synthetic data equal to the amount of actual data retrieved from synthetic data stream 1309. In some aspects, the rate of synthetic data generation can match the rate of actual data generation. As a nonlimiting example, when streamlining data source 1301 retrieves a batch of 10 samples of actual data, dataset generator 1307 can be configured to generate a batch of 10 samples of synthetic data. As a further nonlimiting example, when streamlining data source 1301 retrieves a batch of actual data every 10 minutes, dataset generator 1307 can be configured to generate a batch of actual data every 10 minutes. In this manner, system 1300 can be configured to generate synthetic data similar in both content and temporal characteristics to the reference data stream data.

In various embodiments, dataset generator 1307 can be configured to provide synthetic data generated using the current data model to synthetic data source 1309. In some embodiments, synthetic data source 1309 can be configured to provide the synthetic data received from dataset generator 1307 to a database, a file, a datasource, a topic in a data streaming platform (e.g., IBM STREAMS), a topic in a distributed messaging system (e.g., APACHE KAFKA), or the like.

As discussed above, system 1300 can be configured to track the reference data stream by repeatedly switching data models of the reference data stream. In some embodiments, dataset generator 1307 can be configured to switch between synthetic data models at a predetermined time, or upon expiration of a time interval. For example, model optimizer 1307 can be configured to switch from an old model to a current model every hour, day, week, or the like. In various embodiments, system 1300 can detect when a data schema of the reference data stream changes and switch to a current data model configured to provide synthetic data with the current schema. Consistent with disclosed embodiments, switching between synthetic data models can include dataset generator 1307 retrieving a current model from model storage 1305 and computing resources 1304 providing a new synthetic data model for storage in model storage 1305. In some aspects, computing resources 1304 can update the current synthetic data model with the new synthetic data model and then dataset generator 1307 can retrieve the updated current synthetic data model. In various aspects, dataset generator 1307 can retrieve the current synthetic data model and then computing resources 1304 can update the current synthetic data model with the new synthetic data model. In some embodiments, model optimizer 1303 can provision computing resources 1304 with a synthetic data model for training using a new set of training data. In various embodiments, computing resources 1304 can be configured to continue updating the new synthetic data model. In this manner, a repeat of the switching process can include generation of a new synthetic data model and the replacement of a current synthetic data model by this new synthetic data model.

Figure 14:
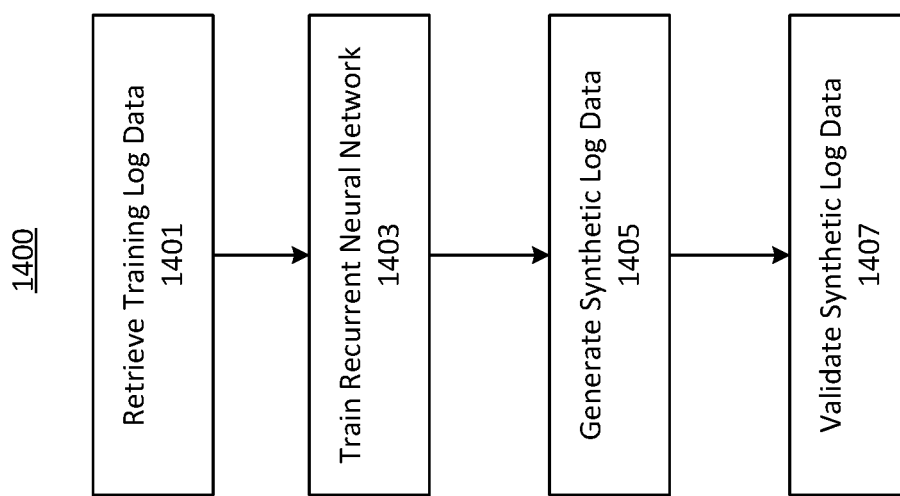
FIG. 14 depicts a process for generating synthetic JSON log data using the cloud computing system of FIG. 13, consistent with disclosed embodiments.

FIG. 14 depicts a process 1400 for generating synthetic JSON log data using the cloud computing system of FIG. 13. Process 1400 can include the steps of retrieving reference JSON log data, training a recurrent neural network to generate synthetic data resembling the reference JSON log data, generating the synthetic JSON log data using the recurrent neural network, and validating the synthetic JSON log data. In this manner system 1300 can use process 1400 to generate synthetic JSON log data that resembles actual JSON log data.

After starting, process 1400 can proceed to step 1401. In step 1401, substantially as described above with regard to FIG. 13, streaming data source 1301 can be configured to retrieve the JSON log data from a database, a file, a datasource, a topic in a distributed messaging system such as Apache Kafka, or the like. The JSON log data can be retrieved in response to a request from model optimizer 1303. The JSON log data can be retrieved in real-time, or periodically (e.g., approximately every five minutes).

Process 1400 can then proceed to step 1403. In step 1403, substantially as described above with regard to FIG. 13, computing resources 1304 can be configured to train a recurrent neural network using the received data. The training of the recurrent neural network can proceed as described in "Training Recurrent Neural Networks," 2013, by Ilya Sutskever, which is incorporated herein by reference in its entirety.

Process 1400 can then proceed to step 1405. In step 1405, substantially as described above with regards to FIG. 13, dataset generator 1307 can be configured to generate synthetic JSON log data using the trained neural network. In some embodiments, dataset generator 1307 can be configured to generate the synthetic JSON log data at the same rate as actual JSON log data is received by streaming data source 1301. For example, dataset generator 1307 can be configured to generate batches of JSON log data at regular time intervals, the number of elements in a batch dependent on the number of elements received by streaming data source 1301. As an additional example, dataset generator 1307 can be configured to generate an element of synthetic JSON log data upon receipt of an element of actual JSON log data from streaming data source 1301.

Process 1400 can then proceed to step 1407. In step 1407, dataset generator 1307 (or another component of system 1300) can be configured to validate the synthetic data stream. For example, dataset generator 1307 can be configured to use a JSON validator (e.g., JSON SCHEMA VALIDATOR, JSONLINT, or the like) and a schema for the reference data stream to validate the synthetic data stream. In some embodiments, the schema describes key-value pairs present in the reference data stream. In some aspects, system 1300 can be configured to derive the schema from the reference data stream. In some embodiments, validating the synthetic data stream can include validating that keys present in the synthetic data stream are present in the schema. For example, when the schema includes the keys "first_name": "type": "string" and "last_name": {"type": "string"}, system 1300 may not validate the synthetic data stream when objects in the data stream lack the "first_name" and "last_name" keys. Furthermore, in some embodiments, validating the synthetic data stream can include validating that key-value formats present in the synthetic data stream match corresponding key-value formats in the reference data stream. For example, when the schema includes the keys "first_name": "type": "string" and "last_name": {"type": "string"}, system 1300 may not validate the synthetic data stream when objects in the data stream include a numeric-valued "first_name" or "last_name".

Figure 15:
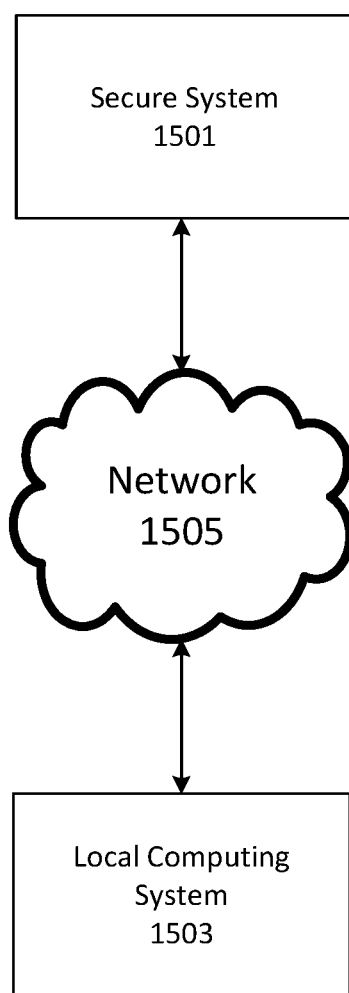
FIG. 15 depicts a system for secure generation and insecure use of models of sensitive data, consistent with disclosed embodiments.

FIG. 15 depicts a system 1500 for secure generation and insecure use of models of sensitive data. System 1500 can include a remote system 1501 and a local system 1503 that communicate using network 1505. Remote system 1501 can be substantially similar to system 100 and be implemented, in some embodiments, as described in FIG. 4. For example, remote system 1501 can include an interface, model optimizer, and computing resources that resemble interface 113, model optimizer 107, and computing resources 101, respectively, described above with regards to FIG. 1. For example, the interface, model optimizer, and computing resources can provide similar functionality to interface 113, model optimizer 107, and computing resources 101, respectively, and can be similarly implemented. In some embodiments, remote system 1501 can be implemented using a cloud computing infrastructure. Local system 1503 can comprise a computing device, such as a smartphone, tablet, laptop, desktop, workstation, server, or the like. Network 1505 can include any combination of electronics communications networks enabling communication between components of system 1500 (similar to network 115).

In various embodiments, remote system 1501 can be more secure than local system 1503. For example, remote system 1501 can better protected from physical theft or computer intrusion than local system 1503. As a non-limiting example, remote system 1501 can be implemented using AWS or a private cloud of an institution and managed at an institutional level, while the local system can be in the possession of, and managed by, an individual user. In some embodiments, remote system 1501 can be configured to comply with policies or regulations governing the storage, transmission, and disclosure of customer financial information, patient healthcare records, or similar sensitive information. In contrast, local system 1503 may not be configured to comply with such regulations.

System 1500 can be configured to perform a process of generating synthetic data. According to this process, system 1500 can train the synthetic data model on sensitive data using remote system 1501, in compliance with regulations governing the storage, transmission, and disclosure of sensitive information. System 1500 can then transmit the synthetic data model to local system 1503, which can be configured to use the system to generate synthetic data locally. In this manner, local system 1503 can be configured to use synthetic data resembling the sensitive information, which comply with policies or regulations governing the storage, transmission, and disclosure of such information.

According to this process, the model optimizer can receive a data model generation request from the interface. In response to the request, the model optimizer can provision computing resources with a synthetic data model. The computing resources can train the synthetic data model using a sensitive dataset (e.g., consumer financial information, patient healthcare information, or the like). The model optimizer can be configured to evaluate performance criteria of the data model (e.g., the similarity metric and prediction metrics described herein, or the like). Based on the evaluation of the performance criteria of the synthetic data model, the model optimizer can be configured to store the trained data model and metadata of the data model (e.g., values of the similarity metric and prediction metrics, of the data, the origin of the new synthetic data model, the data used to generate the new synthetic data model, when the new synthetic data model was generated, and the like). For example, the model optimizer can determine that the synthetic data model satisfied predetermined acceptability criteria based on one or more similarity and/or prediction metric value.

Local system 1503 can then retrieve the synthetic data model from remote system 1501. In some embodiments, local system 1503 can be configured to retrieve the synthetic data model in response to a synthetic data generation request received by local system 1503. For example, a user can interact with local system 1503 to request generation of synthetic data. In some embodiments, the synthetic data generation request can specify metadata criteria for selecting the synthetic data model. Local system 1503 can interact with remote system 1501 to select the synthetic data model based on the metadata criteria. Local system 1503 can then generate the synthetic data using the data model in response to the data generation request.

Figure 16:
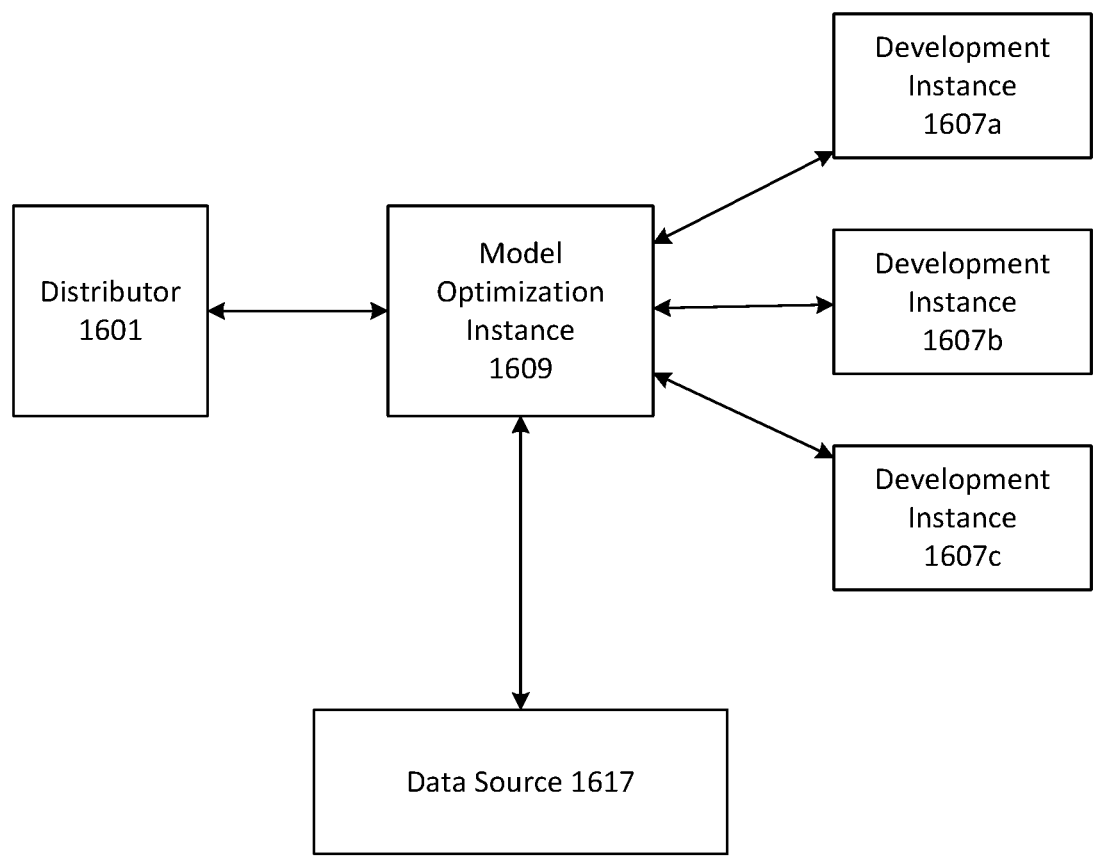
FIG. 16 depicts a system for hyperparameter tuning, consistent with disclosed embodiments.

FIG. 16 depicts a system 1600 for hyperparameter tuning, consistent with disclosed embodiments. In some embodiments, system 1600 can implement components of FIG. 1, similar to system 400 of FIG. 4. In this manner, system 1600 can implement hyperparameter tuning functionality in a stable and scalable fashion using a distributed computing environment such as a public cloud-computing environment, a private cloud computing environment, a hybrid cloud computing environment, a computing cluster or grid, a cloud compute service, or the like. For example, as computing requirements increase for a component of system 1600 (e.g., as additional development instances are required to test additional hyperparameter combinations), additional physical or virtual machines can be recruited to that component. As in system 400, in some embodiments, dataset generator 103 and model optimizer 107 can be hosted by separate virtual computing instances of the cloud computing system.

In some embodiments, system 1600 can include a distributor 1601 with functionality resembling the functionality of distributor 401 of system 400. For example, distributor 1601 can be configured to provide, consistent with disclosed embodiments, an interface between the components of system 1600, and interfaces between the components of system 1600 and other systems. In some embodiments, distributor 1601 can be configured to implement interface 113 and a load balancer. In some aspects, distributor 1601 can be configured to route messages between elements of system 1600 (e.g., between data source 1617 and the various development instances, or between data source 1617 and model optimization instance 1609). In various aspects, distributor 1601 can be configured to route messages between model optimization instance 1609 and external systems. The messages can include data and instructions. For example, the messages can include model generation requests and trained models provided in response to model generation requests. Consistent with disclosed embodiments, distributor 401 can be implemented using one or more EC2 clusters or the like.

In some embodiments, system 1600 can include a development environment implementing one or more development instances (e.g., development instances 1607a, 1607b, and 1607c). The development environment can be configured to implement at least a portion of the functionality of computing resources 101, consistent with disclosed embodiments. In some aspects, the development instances (e.g., development instance 407) hosted by the development environment can train one or more individual models. In some aspects, system 1600 can be configured to spin up additional development instances to train additional data models, as needed. In some embodiments, system 1600 comprises a serverless architecture and the development instance may be an ephemeral container instance or computing instance. System 1600 may be designed to receive a request for a task involving hyperparameter tuning; provision computing resources by spinning up (i.e., generating) development instances in response to the request; assign the requested task to the development instance; and terminate or assign a new task to the development instance when the development instance completes the requested task. Termination or assignment may be based on performance of the development instance or the performance of another development instance. In this way, the serverless architecture may more efficiently allocate resources during hyperparameter tuning than traditional, server-based architectures.

In some aspects, a development instance can implement an application framework such as TENSORBOARD, JUPYTER, and the like, as well as machine learning applications like TENSORFLOW, CUDNN, KERAS, and the like. Consistent with disclosed embodiments, these application frameworks and applications can enable the specification and training of models. In various aspects, the development instances can be implemented using EC2 clusters or the like.

Development instances can be configured to receive models and hyperparameters from model optimization instance 1609, consistent with disclosed embodiments. In some embodiments, a development instance can be configured to train a received model according to received hyperparameters until a training criterion is satisfied. In some aspects, the development instance can be configured to use training data provided by data source 1617 to train the data. In various aspects, the data can be received from model optimization instance 1609, or another source. In some embodiments, the data can be actual data. In various embodiments, the data can be synthetic data.

Upon completion of training a model, a development instance can be configured to provide the trained model (or parameters describing the trained models, such as model weights, coefficients, offsets, or the like) to model optimization instance 1609. In some embodiments, a development instance can be configured to determine the performance of the model. As discussed herein, the performance of the model can be assessed according to a similarity metric and/or a prediction metric. In various embodiments, the similarity metric can depend on at least one of a statistical correlation score, a data similarity score, or a data quality score. In some embodiments, the development instance can be configured to wait for provisioning by model optimization instance 1609 with another model and another hyperparameter selection.

In some aspects, system 1600 can include model optimization instance 1609. Model optimization instance 1609 can be configured to manage training and provision of data models by system 1600. In some aspects, model optimization instance 1609 can be configured to provide the functionality of model optimizer 107. For example, model optimization instance 1609 can be configured to retrieve an at least partially initialized model from data source 1617. In some aspects, model optimization instance 1609 can be configured to retrieve this model from data source 1617 based on a model generation request received from a user or another system through distributor 1601. Model optimization instance 1609 can be configured to provision development instances with copies of the stored model according to stored hyperparameters of the model. Model optimization instance 1609 can be configured to receive trained models and performance metric values from the development instances. Model optimization instance 1609 can be configured to perform a search of the hyperparameter space and select new hyperparameters. This search may or may not depend on the values of the performance metric obtained for other trained models. In some aspects, model optimization instance 1609 can be configured to perform a grid search or a random search.

Consistent with disclosed embodiments, data source 1617 can be configured to provide data to other components of system 1600. In some embodiments, data source 1617 can include sources of actual data, such as streams of transaction data, human resources data, web log data, web security data, web protocols data, or system logs data. System 1600 can also be configured to implement model storage 109 using a database (not shown) accessible to at least one other component of system 1600 (e.g., distributor 1601, development instances 1607a-1607c, or model optimization instance 1609). In some aspects, the database can be an s3 bucket, relational database, or the like. In some aspects, data source 1617 can be indexed. The index can associate one or more model characteristics, such as model type, data schema, training dataset type, model task, hyperparameters, or training dataset with a model stored in memory.

As described herein, the model type can include neural network, recurrent neural network, generative adversarial network, kernel density estimator, random data generator, linear regression model, or the like. Consistent with disclosed embodiments, a data schema can include (1) column variables when the input data is spreadsheet or relational database data, (2) key-value pairs when the input data is JSON data, (3) object or class definitions, or (4) other data-structure descriptions.

Consistent with disclosed embodiments, training dataset type can indicate a type of log file (e.g., application event logs, error logs, or the like), spreadsheet data (e.g., sales information, supplier information, inventory information, or the like), account data (e.g., consumer checking or savings account data), or other data.

Consistent with disclosed embodiments, a model task can include an intended use for the model. For example, an application can be configured to use a machine learning model in a particular manner or context. This manner or context can be shared across a variety of applications. In some aspects, the model task can be independent of the data processed. For example, a model can be used for predicting the value of a first variable from the values of a set of other variables. As an additional example, a model can be used for classifying something (an account, a loan, a customer, or the like) based on characteristics of that thing. As a further example, a model can be used to determine a threshold value for a characteristic, beyond which the functioning or outcome of a system or process changes (e.g., a credit score below which a loan becomes unprofitable). For example, a model can be trained to determine categories of individuals based on credit score and other characteristics. Such a model may prove useful for other classification tasks performed on similar data.

Consistent with disclosed embodiments, hyperparameters can include training parameters such as learning rate, batch size, or the like, or architectural parameters such as number of layers in a neural network, the choice of activation function for a neural network node, the layers in a convolutional neural network, or the like. Consistent with disclosed embodiments, a dataset identifier can include any label, code, path, filename, port, URL, URI or other identifier of a dataset used to train the model, or a dataset for use with the model.

As a nonlimiting example of the use of an index of model characteristics, system 1600 can train a classification model to identify loans likely to be nonperforming based using a dataset of loan application data with a particular schema. This classification model can be trained using an existing subset of the dataset of loan application data. An application can then use this classification model to identify likely nonperforming loans in new loan application data as that new data is added to the dataset. Another application may then become created that predicts the profitability of loans in the same dataset. A model request may also become submitted indicating one or more of the type of model (e.g., neural network), the data schema, the type of training dataset (loan application data), the model task (prediction), and an identifier of the dataset used to generate the data. In response to this request, system 1600 can be configured to use the index to identify the classification model among other potential models stored by data source 1617.

FIG. 17 depicts a process 1700 for hyperparameter tuning, consistent with disclosed embodiments. According to process 1700, model optimizer 107 can interact with computing resources 101 to generate a model through automated hyperparameter tuning. In some aspects, model optimizer 107 can be configured to interact with interface 113 to receive a model generation request. In some aspect, model optimizer 107 can be configured to interact with interface 113 to provide a trained model in response to the model generation request. The trained model can be generated through automated hyperparameter tuning by model optimizer 107. In various aspects, the computing resources can be configured to train the model using data retrieved directly from database 105, or indirectly from database 105 through dataset generator 103. The training data can be actual data or synthetic data. When the data is synthetic data, the synthetic data can be retrieved from database 105 or generated by dataset generator for training the model. Process 1700 can be implemented using system 1600, described above with regards to FIG. 16. According to this exemplary and nonlimiting implementation, model optimization instance 1609 can implement the functionality of model optimizer 107, computing resources 101 can implement one or more development instances (e.g., development instance 1607a-1607c), distributor 1601 can implement interface 113, and data source 1617 can implement or connect to database 105.

In step 1701, model optimizer 107 can receive a model generation request. The model generation request can be received through interface 113. The model generation request may have been provided by a user or another system. In some aspects, the model generation request can indicate model characteristics including at least one of a model type, a data schema, a training dataset type, a model task, or a training dataset identifier. For example, the request can be, or can include, an API call. In some aspects, the API call can specify a model characteristic. As described herein, the data schema can include column variables, key-value pairs, or other data schemas. For example, the data schema can describe a spreadsheet or relational database that organizes data according to columns having specific semantics. As an additional example, the data schema can describe keys having particular constraints (such as formats, data types, and ranges) and particular semantics. The model task can comprise a classification task, a prediction task, a regression task, or another use of a model. For example, the model task can indicate that the requested model will be used to classify datapoints into categories or determine the dependence of an output variable on a set of potential explanatory variables.

In step 1703, model optimizer 107 can retrieve a stored model from model storage 109. In some aspects, the stored model can be, or can include, a recurrent neural network, a generative adversarial network, a random data model, or a kernel density estimation function. In various aspects, model optimizer 107 can also retrieve one or more stored hyperparameter values for the stored model. The stored hyperparameters can include training hyperparameters, which can affect how training of the model occurs, or architectural hyperparameters, which can affect the structure of the model. For example, when the stored model comprises a generative adversarial network, training parameters for the model can include a weight for a loss function penalty term that penalizes the generation of training data according to a similarity metric. As a further example, when the stored model comprises a neural network, the training parameters can include a learning rate for the neural network. As an additional example, when the model is a convolutional neural network, architectural hyperparameters can include the number and type of layers in the convolutional neural network.

In some embodiments, model optimizer 107 can be configured to retrieve the stored model (and optionally the stored one or more stored hyperparameters) based on the model generation request and an index of stored models. The index of stored models can be maintained by model optimizer 107, model storage 109, or another component of system 100. The index can be configured to permit identification of a potentially suitable model stored in model storage 109 based on model type, data schema, training dataset type, model task, training dataset identifier, and/or other modeling characteristic. For example, when a request includes a model type and data schema, model optimizer 107 can be configured to retrieve identifiers, descriptors, and/or records for models with matching or similar model types and data schemas. In some aspects, similarity can be determined using a hierarchy or ontology for model characteristics having categorical values. For example, a request for a model type may return models belonging to a genus encompassing the requested model type, or models belonging to a more specific type of model than the requested model type. In some aspects, similarity can be determined using a distance metric for model characteristics having numerical and/or categorical values. For example, differences between numerical values can be weighted and differences between categorical values can be assigned values. These values can be combined to generate an overall value. Stored models can be ranked and/or thresholded by this overall value.

In some embodiments, model optimizer 107 can be configured to select one or more of the matching or similar models. The selected model or models can then be trained, subject to hyperparameter tuning. In various embodiments, the most similar models (or the matching models) can be automatically selected. In some embodiments, model optimizer 107 can be configured to interact with interface 113 to provide an indication of at least some of the matching models to the requesting user or system. Model optimizer 107 can be configured to receive, in response, an indication of a model or models. Model optimizer 107 can be configured to then select this model or models.

In step 1705, model optimizer 107 can provision computing resources 101 with the stored model according to the one or more stored hyperparameter values. For example, model optimizer 107 can be configured to provision resources and provide commands to a development instance hosted by computing resources 101. The development instance may be an ephemeral container instance or computing instance. In some embodiments, provisioning resources to the development instance comprises generating the development instance, i.e., spinning up a development instance. Alternatively, provisioning resources comprises providing commands to a running development instance, i.e., a warm development instance. Provisioning resources to the development instance may comprise allocating memory, allocating processor time, or allocating other compute parameters. The development instance can be configured to execute these commands to create an instance of the model according to values of any stored architectural hyperparameters associated with the model and train the model according to values of any stored training hyperparameters associated with the model. The development instance can be configured to use training data indicated and/or provided by model optimizer 107. In some embodiments, the development instance can be configured to retrieve the indicated training data from dataset generator 103 and/or database 105. In this manner, the development instance can be configured to generate a trained model. In some embodiments, the development instance can be configured to terminate training of the model upon satisfaction of a training criterion, as described herein. In various embodiments, the development instance can be configured to evaluate the performance of the trained model. The development instance can evaluate the performance of the trained model according to a performance metric, as described herein. In some embodiments, the value of the performance metric can depend on a similarity between data generated by a trained model and the training data used to train the trained model. In various embodiments, the value of the performance metric can depend on an accuracy of classifications or predictions output by the trained model. As an additional example, in various embodiments, the development instance can determine, for example, a univariate distribution of variable values or correlation coefficients between variable value. In such embodiments, the trained model and the performance information can be provided to model optimizer 107. In various embodiments, the evaluation of model performance can be performed by model optimizer 107 or by another system or instance. For example, a development instance can be configured to evaluate the performance of models trained by other development instances.

In step 1707, model optimizer 107 can provision computing resources 101 with the stored model according to one or more new hyperparameter values. Model optimizer 107 can be configured to select the new hyperparameters from a space of potential hyperparameter values. In some embodiments, model optimizer 107 can be configured to search the hyperparameters space for the new hyperparameters according to a search strategy. As described above, the search strategy may or may not depend on the values of the performance metric returned by the development instances. For example, in some embodiments model optimizer 107 can be configured to select new values of the hyperparameters near the values used for the trained models that returned the best values of the performance metric. In this manner, the one or more new hyperparameters can depend on the value of the performance metric associated with the trained model evaluated in step 1705. As an additional example, in various embodiments model optimizer 107 can be configured to perform a grid search or a random search. In a grid search, the hyperparameter space can be divided up into a grid of coordinate points. Each of these coordinate points can comprise a set of hyperparameters. For example, the potential range of a first hyperparameter can be represented by three values and the potential range of a second hyperparameter can be represented by two values. The coordinate points may then include six possible combinations of these two hyperparameters (e.g., where the "lines" of the grid intersect). In a random search, model optimizer 107 can be configured to select random coordinate points from the hyperparameter space and use the hyperparameters comprising these points to provision models. In some embodiments, model optimizer 107 can provision the computing resources with the new hyperparameters, without providing a new model. Instead, the computing resources can be configured to reset the model to the original state and retrain the model according to the new hyperparameters. Similarly, the computing resources can be configured to reuse or store the training data for the purpose of training multiple models.

As described above, model optimizer 107 can provision the computing resources by providing commands to a development instance hosted by computing resources 101. The development instance can be configured to execute these commands according to new hyperparameters to create and train an instance of the model. As in step 1705, the development instance can be configured to use training data indicated and/or provided by model optimizer 107. In some embodiments, the development instance can be configured to retrieve the indicated training data from dataset generator 103 and/or database 105. In this manner, the development instance can be configured to generate a second trained model. As in step 1705, in some embodiments, the development instance can be configured to terminate training of the model upon satisfaction of a training criterion, as described herein. As in step 1705, the development instance, model optimizer 107, and/or another system or instance can evaluate the performance of the trained model according to a performance metric.

In step 1709, model optimizer 107 can determine satisfaction of a termination condition. In some embodiments, the termination condition can depend on a value of the performance metric obtained by model optimizer 107. For example, the value of the performance metric can satisfy a predetermined threshold criterion. As an additional example, model optimizer 107 can track the obtained values of the performance metric and determine an improvement rate of these values. The termination criterion can depend on a value of the improvement rate. For example, model optimizer 107 can be configured to terminate searching for new models when the rate of improvement falls below a predetermined value. In some embodiments, the termination condition can depend on an elapsed time or number of models trained. For example, model optimizer 107 can be configured to train models to a predetermined number of minutes, hours, or days. As an additional example, model optimizer 107 can be configured to generate tens, hundreds, or thousands of models. Model optimizer 107 can then select the model with the best value of the performance metric. Once the termination condition is satisfied, model optimizer 107 can cease provisioning computing resources with new hyperparameters. In some embodiments, model optimizer 107 can be configured to provide instructions to computing resources still training models to terminate training of those models. In some embodiments, model optimizer 107 may terminate (spin down) one or more development instances once the termination criterion is satisfied.

In step 1711, model optimizer 107 can store the trained model corresponding to the best value of the performance metric in model storage 109. In some embodiments, model optimizer 107 can store in model storage 109 at least some of the one or more hyperparameters used to generate the trained model corresponding to the best value of the performance metric. In various embodiments, model optimizer 107 can store in model storage 109 model metadata, as described herein. In various embodiments, this model metadata can include the value of the performance metric associated with the model.

In step 1713, model optimizer 107 can update the model index to include the trained model. This updating can include creation of an entry in the index associating the model with the model characteristics for the model. In some embodiments, these model characteristics can include at least some of the one or more hyperparameter values used to generate the trained model. In some embodiments, step 1713 can occur before or during the storage of the model described in step 1711.

In step 1715 model optimizer 107 can provide the trained model corresponding to the best value of the performance metric in response to the model generation request. In some embodiments, model optimizer 107 can provide this model to the requesting user or system through interface 113. In various embodiments, model optimizer 107 can be configured to provide this model to the requesting user or system together with the value of the performance metric and/or the model characteristics of the model.

Figure 18:
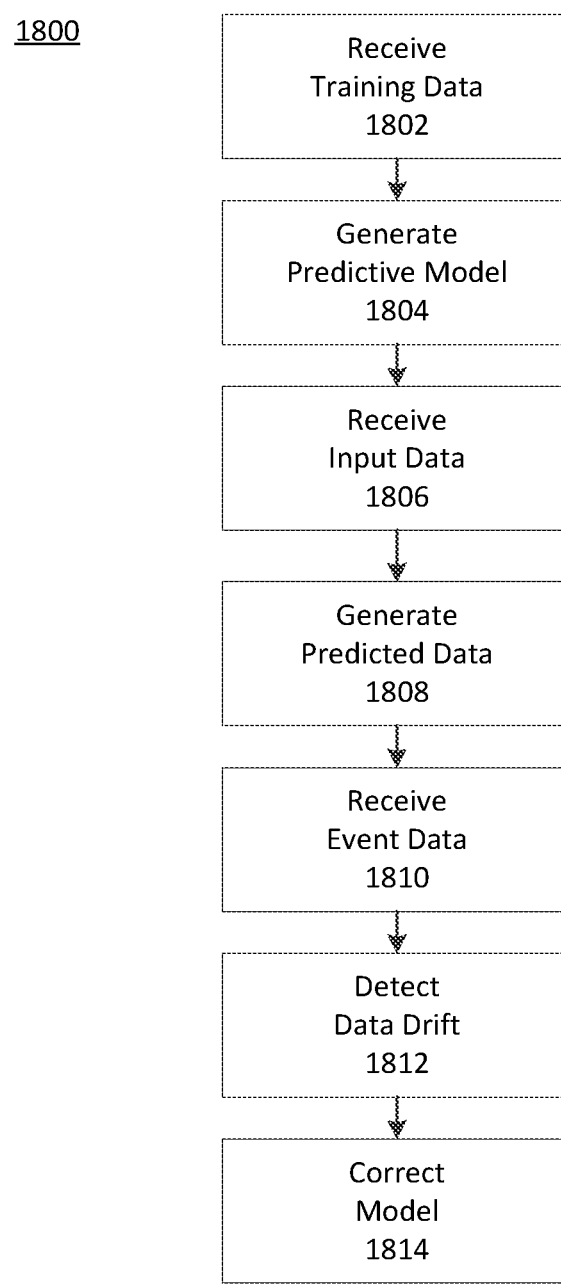
FIG. 18 depicts a process for detecting data drift, consistent with disclosed embodiments.

FIG. 18 depicts process 1800 for detecting data drift, consistent with disclosed embodiments. In some embodiments, process 1800 is performed by components of system 100, including computing resources 101, dataset generator 103, database 105, model optimizer 107, model storage 109, model curator 111, and/or interface 113, consistent with disclosed embodiments. In some embodiments, process 1800 is performed as a service. For example, process 1800 may be performed by a cloud-computing service that spins up (generates) one or more ephemeral container instances (e.g., development instance 407) to perform some or all steps of process 1800. As one of skill in the art will appreciate, other implementations of process 1800 are possible.

Process 1800 may be performed to detect drift in data used for models, including predictive models (e.g., forecasting models or classification models). Models of process 1800 may include recurrent neural networks, kernel density estimators, or the like. In some embodiments, process 1800 may be performed to detect data drift used in neural network models used for data classification or data forecasting (e.g., economic models, financial models, water resource models, employee performance models, climate models, traffic models, weather models, or the like), consistent with disclosed embodiments.

At step 1802, model training data are received, consistent with disclosed embodiments. In some embodiments, model optimizer 107 receives model training data. Model training data may include, for example, financial data, transaction data, climate data, groundwater data, hydrologic data, traffic data, employee data, or other data. Model training data may include actual data and/or synthetic data.

At step 1804, a predictive model is generated, consistent with disclosed embodiments. Generating a model at step 1804 may include various processes of disclosed embodiments. For example, model optimizer 107 may generate a predictive model in a manner consistent with the embodiments described herein. The model of step 1804 may be a recurrent neural network, a deep learning model, a convolutional neural network model, or other machine learning model. In some embodiments, the predictive model of step 1804 is one of a forecasting model or a classification model.

Step 1804 may include training the predictive model using received model training data, consistent with disclosed embodiments. In some embodiments, training terminates upon satisfaction of one or more termination conditions. Consistent with disclosed embodiments, the termination condition(s) may be based on a performance metric of the predictive model, an elapsed time, a number of models trained, a number of epochs, an accuracy score, or a rate of change of an accuracy score.

Step 1804 may include hyperparameter tuning of the predictive model, consistent with disclosed embodiments. Hyperparameter tuning at step 1804 may include storing at least one of an architectural hyperparameter or a training hyperparameter in memory (e.g., in a database such as database 105 or in model storage 109). In some embodiments, hyperparameter tuning at step 1804 includes iteratively adjusting a hyperparameter of the predictive model (e.g., adjusting a number of layers in a neural network, an activation function for a neural network node, a filter in a convolutional neural network, or the like); training the model using the adjusted hyperparameter; determining a performance metric of the trained model; and terminating hyperparameter tuning if the performance metric meets or exceeds a threshold.

At step 1806, model input data is received, the model input data having a data category. For example, the data category may be stock market data, rainfall data, transaction data, climate data, health data, educational outcome data, demographic data, sales data, poll data, etc. Model input data may be composed entirely of actual data, a mix of actual data and synthetic data, or entirely of synthetic data. In some embodiments, receiving model input data includes receiving model input data from at least one of a database (e.g., database 105) or an interface (e.g., interface 113). In some embodiments, receiving model input data includes receiving a plurality of model input datasets. Each of the plurality of model input datasets may include synthetic data and/or actual data.

At step 1808, the predictive model generates predicted data based on the model input data, consistent with disclosed embodiments. In some embodiments, the predicted data may be forecasting data or classification data. The predicted data may be of the same category or of a different category as the input data. For example, a stock value forecasting model may be applied to model input data consisting of historic stock values (same category) or may be applied to model input data that includes stock values and energy consumption data (different category). In some embodiments, implementing the predictive model to generate predicted data is performed according to a schedule. For example, the predictive model may be implemented daily based on received data to generate generated values at five-minute increments over the next week (e.g., stock forecast, weather forecast, etc.), consistent with disclosed embodiments. In some embodiments, step 1808 is performed a plurality of times over a plurality of different model input datasets. In some embodiments, the duration and/or periodicity of the schedule may be based on one or more aspects of the disclosed embodiments, such as a characteristic of the training data, predicted data, or event data (e.g., variance, sampling rate, detecting a measured value falls inside or outside a particular range or above or below particular threshold, etc.), detecting a correction in the predictive model, or other such feature of the disclosed embodiments.

Step 1810 includes receiving event data, the event data being of the same category as the predicted data. Event data may be the data that corresponds to the real-world data that the predictive model was used to predict. Event data may be composed entirely of actual data. In some embodiments, event data of step 1810 may be composed of a mix of actual data and synthetic data. For example, sensitive data items (e.g., personal identifiers, account numbers, or the like) may be replaced with synthetic data items. In some embodiments, synthetic data is used to complete the dataset, consistent with disclosed embodiments. In some embodiments, the event data of step 1810 may be entirely synthetic data. In some embodiments, receiving event data includes receiving event data from at least one of a database (e.g., database 105) or an interface (e.g., interface 113). In some embodiments, step 1810 is performed a plurality of times. For example, step 1810 may be performed according to a schedule (e.g., event data is received hourly or daily).

At step 1812, data drift is detected. In some embodiments, detecting data drift is a based on a comparison of predicted data to event data to determine a difference between predicted data and event data. In the embodiments, detecting data drift may be based on known statistical methods. For example, detecting data drift at step 1812 may be based on at least one of a least squares error method, a regression method, a correlation method, or other known statistical method. In some embodiments, the difference is determined using at least one of a Mean Absolute Error, a Root Mean Squared Error, a percent good classification, or the like. In some embodiments, detecting a difference between predicted data and event data includes determining whether a difference between generated data and event data meets or exceeds a threshold difference. In some embodiments, detecting data drift includes determining a difference between the data profile of the predicted data and the data profile of the event data. For example, drift may be detected based on a difference between the covariance matrix of the predicted data and a covariance matrix of the event data.

At step 1814, the model may be corrected (updated) based on detected drift. Correcting the model may include model training and/or hyperparameter tuning, consistent with disclosed embodiments. Correcting the model may be involve model training or hyperparameter tuning using the received event data and/or other data.

Figure 19:
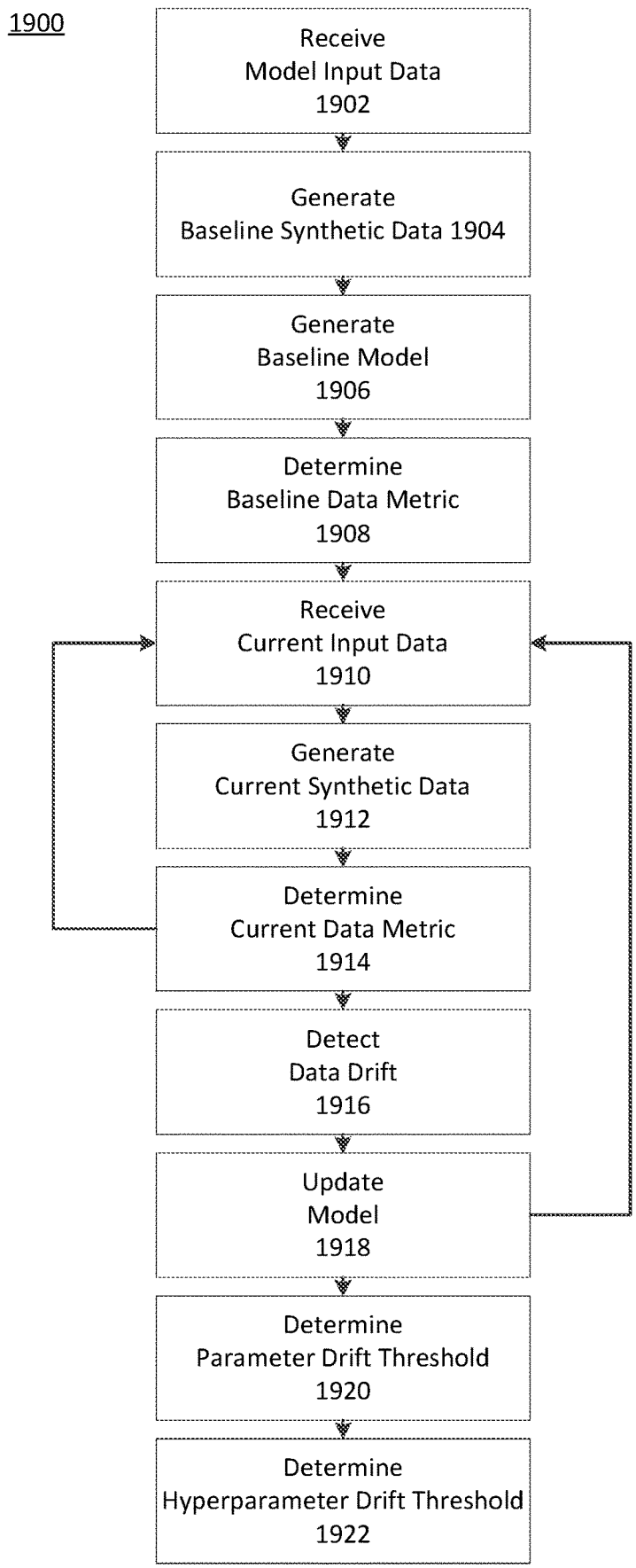
FIG. 19 depicts a process for detecting data drift, consistent with disclosed embodiments.

FIG. 19 depicts process 1900 for detecting data drift, consistent with disclosed embodiments.

In some embodiments, process 1900 is performed by components of system 100, including computing resources 101, dataset generator 103, database 105, model optimizer 107, model storage 109, model curator 111, and/or interface 113, consistent with disclosed embodiments. In some embodiments, process 1900 is performed as a service. For example, process 1900 may be performed by a cloud-computing service that spins up (generates) one or more ephemeral container instances (e.g., development instance 407) to perform some or all steps of process 1900. As one of skill in the art will appreciate, other implementations of process 1900 are possible.

At step 1902, model input data is received, the model input data having a data category. For example, the data category may be stock market data, rainfall data, transaction data, climate data, health data, educational outcome data, demographic data, sales data, poll data, etc. Model input data may be composed entirely of actual data, a mix of actual data and synthetic data, or entirely of synthetic data. In some embodiments, receiving model input data includes receiving model input data from at least one of a database (e.g., database 105) or an interface (e.g., interface 113). In some embodiments, receiving model input data includes receiving a plurality of model input datasets. Each of the plurality of model input datasets may include synthetic data and/or actual data.

At step 1904, baseline synthetic data is generated using a synthetic data model, the baseline synthetic data being based on the model input data, consistent with disclosed embodiments. For example, dataset generator 103 may generate baseline synthetic data in a manner consistent with the embodiments described herein. In some embodiments, generating baseline synthetic data includes receiving a synthetic data model (e.g., via interface 113) or retrieving a synthetic data model from a model storage (e.g., model storage 109). In some embodiments, a synthetic data model is generated and trained at step 1904 using the model input data and/or other data. In some embodiments, the synthetic data model is a GAN or other machine learning model.

At step 1906 a baseline model is generated using the baseline synthetic data, the baseline model being a machine learning model, consistent with disclosed embodiments. For example, model optimizer 107 may generate baseline model in a manner consistent with the embodiments described herein. Generating the baseline model at step 1906 may including training the model or hyperparameter tuning using the model input data, consistent with disclosed embodiments. In some embodiments, the baseline model may be a recurrent neural network and the baseline model parameters may be weights of hidden layers of the recurrent neural network model. The baseline model of step 1906 has baseline model parameters (e.g., weights, coefficients, offsets, and the like) and baseline hyperparameters (e.g., architectural hyperparameters or training hyperparameters). In some embodiments, step 1906 includes storing baseline model parameters and baseline hyperparameters in memory (e.g., in a database such as database 105 or in model storage 109).

At step 1908, a baseline data metric of the data profile of the baseline synthetic data is determined, the data profile including the data schema and a statistical profile. For example, step 1906 may include determining a baseline covariance matrix of the baseline synthetic data. In some embodiments, the data metric may include a data distribution, a vocabulary (character, word, or the like), a data category, a min, a max, a variance, a quartile, a quantile, a median, a range, or other data metric. In some embodiments, model optimizer 107 determines the baseline data metric.

At step 1910, current input data are received, the current input data having the same category as the model input data. Current input data may be entirely composed of actual data, entirely composed of synthetic data, or include a mix of synthetic data and actual data. Step 1910 may be repeated a plurality of times, as shown in FIG. 19. Current input data may include a plurality of current input datasets, which may be unique datasets or partially overlapping datasets. For example, an actual dataset of the plurality of actual datasets may be received based on a schedule (e.g., daily). Each actual dataset may comprise the previous 30-days of temperature, so that a dataset received on a given day contains one unique value (today's temperature) and 29 values found in previous datasets. In some embodiments, the duration and/or periodicity of the schedule may be based on one or more aspects of the disclosed embodiments, such as a characteristic of the training data, predicted data, or event data (e.g., variance, sampling rate, detecting a measured value falls inside or outside a particular range or above or below particular threshold, etc.), detecting a correction in the predictive model, or other such feature of the disclosed embodiments. As one of skill in the art will appreciate, other schedules and configurations of current input data are possible.

At step 1912, current synthetic data are generated based on current input data. Current synthetic data are generated using a synthetic data model (the synthetic data model of step 1902). For example, dataset generator 103 may generate current synthetic data in a manner consistent with the disclosed embodiments. As shown, step 1910 may be repeated. That is, in some embodiments, a plurality of current synthetic datasets are generated a plurality of times (e.g., based on a schedule). The plurality of synthetic of datasets may be based on respective current input datasets.

At step 1914, a current data metric of a data profile of the current synthetic data is determined. For example, the current data metric may be a current covariance matrix of the current synthetic data. In some embodiments, step 1914 is performed for each of a plurality of current synthetic datasets. For example, model optimizer 107 may determine a current data metric in a manner consistent with the disclosed embodiments.

As shown in FIG. 19, steps 1910-1914 may be repeated a plurality of times before proceeding to step 1916.

At step 1916 data drift is detected based on a difference between a current data metric and a baseline data metric. For example, detecting data drift at step 1916 may involve determining whether a difference between a current data metric and a baseline data metric exceeds a threshold. In some embodiments, model optimizer 107 may detect data drift in a manner consistent with the disclosed embodiments. In some aspects, steps 1910-1914 are repeated a plurality of times, and data drift is detected based on a plurality of current data metrics. Data drift may be detected using known statistical methods applied to the plurality of current data metrics (e.g, by using a least squares error method, a regression method, a correlation method, or other known statistical method).

At step 1918, the baseline model is updated based on the detected data drift. For example, in some embodiments, model optimizer 107 may update the baseline model in a manner consistent with the disclosed embodiments. Updating the baseline model may include training the baseline model or performing hyperparameter tuning, consistent with disclosed embodiments. In some embodiments, updating the baseline model includes hyperparameter tuning, consistent with disclosed embodiments. In some embodiments, hyperparameter tuning includes adjusting a hyperparameter of the baseline model; training the baseline model using the adjusted hyperparameter; determining a performance metric of the trained model; and terminating hyperparameter tuning if the performance metric meets or exceeds a threshold. Step 1918 includes storing updated model parameters and updated model hyperparameters (e.g., architectural or training hyperparameters) in memory (e.g., in a database such as database 105 or in model storage 109).

In some embodiments, updating the baseline model at step 1918 includes hyperparameter tuning, consistent with disclosed embodiments. In some embodiments, hyperparameter tuning at step 1918 includes iteratively adjusting a hyperparameter of the baseline model (e.g., adjusting a number of layers in a neural network, an activation function for a neural network node, a filter in a convolutional neural network, or the like); training the baseline model using the adjusted hyperparameter; determining a performance metric of the trained model; and terminating hyperparameter tuning if the performance metric meets or exceeds a threshold.

As shown in FIG. 19, step 1918 may be repeated a plurality of times (e.g., by repeating steps 1910-1918 a plurality of times). Additionally or alternatively, steps 1910-1918 may be repeated one or more times, as shown in FIG. 19.

At step 1920, a parameter drift threshold is determined, the parameter drift threshold indicating that data drift has occurred. For example, in some embodiments, model optimizer 107 may determine a drift threshold in a manner consistent with the disclosed embodiments. The parameter drift threshold may be a difference between an updated model parameter and a baseline model parameter. In some embodiments, the difference includes a difference in at least one of a model weight, a model coefficient, a model offset, or another model parameter. For example, the parameter drift threshold may be based on a correlation between a difference in a model parameter and a difference in a data covariance matrix. In some embodiments, the difference is determined using known statistical methods. In some embodiments, the parameter drift threshold is determined after updating a model through model training is performed one or more times, and the parameter drift threshold may be determined based on a statistical relationship (e.g., least squares, regression, correlation, or the like) between a difference in a data metric and a difference in a model parameter.

At step 1922, a hyperparameter drift threshold is determined, the hyperparameter drift threshold indicating that data drift has occurred. The hyperparameter drift threshold may be a difference between an updated hyperparameter and a baseline hyperparameter. For example, in some embodiments, model optimizer 107 may determine a hyperparameter drift threshold in a manner consistent with the disclosed embodiments. In some embodiments, the difference includes a difference in at least one of an architectural hyperparameter or a training hyperparameter. For example, the difference may include a difference in at least one of a number of layers in a neural network, a choice of activation function for a neural network node, a filter in a convolutional neural network, or the like. In some embodiments, the hyperparameter drift threshold is determined after updating the model by hyperparameter tuning is performed one or more times, and the hyperparameter drift threshold may be determined based on a statistical relationship (e.g., least squares, regression, correlation, or the like) between a difference in a data metric and a difference in a hyperparameter. For example, an absolute or relative increase in the number of more hidden layer of a neural network above a threshold may be correlated with a difference in a data metric.

Figure 20:
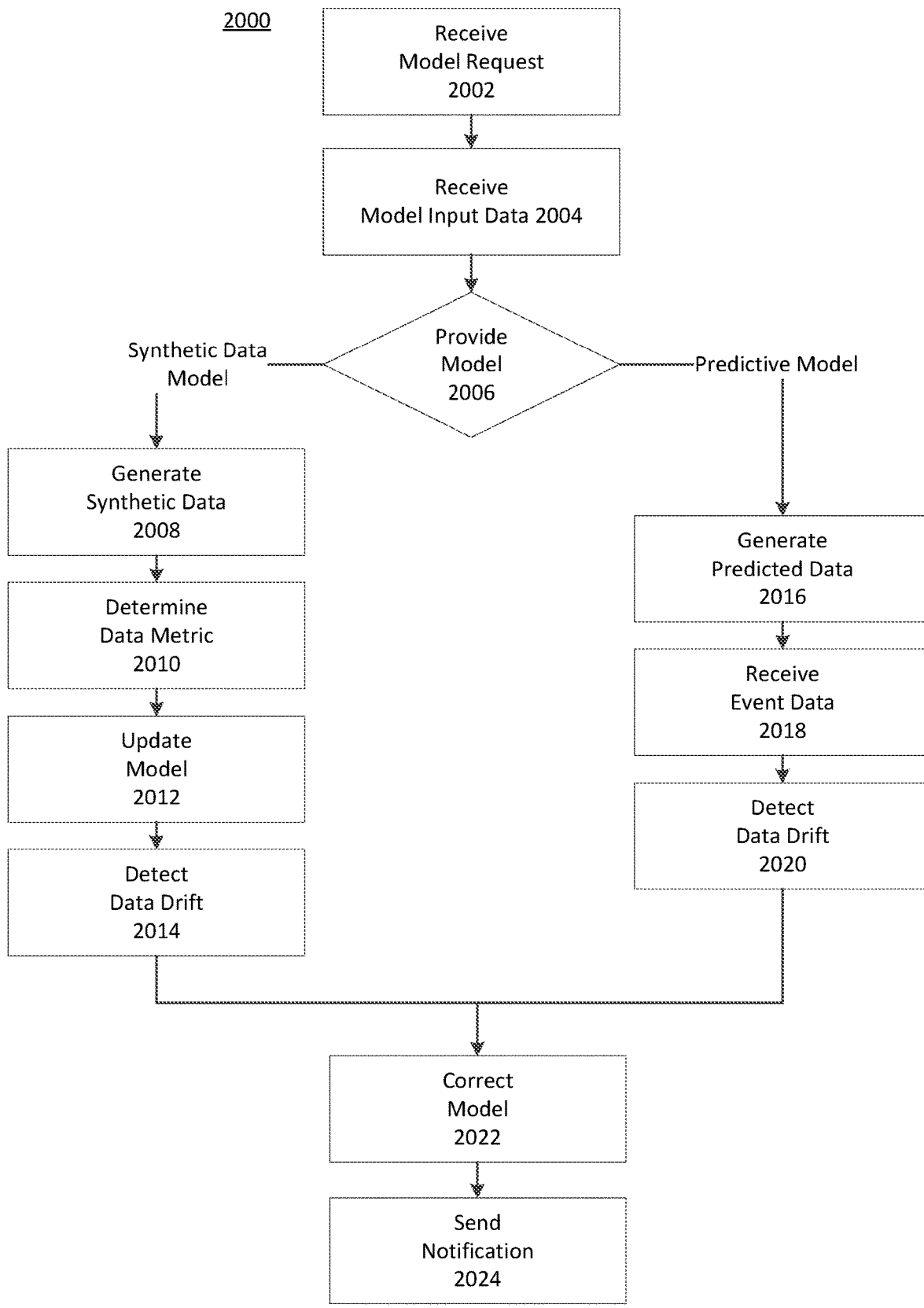
FIG. 20 depicts a process for detecting data drift and updating a model, consistent with disclosed embodiments.

FIG. 20 depicts process 2000 for a process for detecting data drift and updating a model, consistent with disclosed embodiments. Process 2000 may be performed by system 100, for example, as a service to provide a model to a remote device, detect data drift in a stored version of the provided model, and notify the remote device that the provided model should be updated. In some embodiments, process 2000 is performed by components of system 100, including computing resources 101, dataset generator 103, database 105, model optimizer 107, model storage 109, model curator 111, and interface 113, consistent with disclosed embodiments. In some embodiments, process 2000 is performed as a service. For example, process 2000 may be performed by a cloud-computing service that spins up (generates) one or more ephemeral container instances (e.g., development instance 407) to perform some or all steps of process 2000. As one of skill in the art will appreciate, other implementations of process 2000 are possible.

At step 2002, a request for a model is received. In some embodiments, the request is received via interface 113. In some embodiments, the request is received via an event generated at data bucket (e.g., an AMAZON S3 bucket or a KAFKA stream). In some embodiments, the request is received from and/or is associated with a device (e.g., a client device, a server, a mobile device, a personal computer, or the like) or an account (e.g., an email account, a user account, or the like). In some embodiments, the request comprises a training dataset to be used for generating a data model. In some embodiments, the request includes a category of data to be forecasted. For example. the data category may be stock market data, rainfall data, transaction data, climate data, health data, educational outcome data, demographic data, sales data, poll data, etc. In some embodiments, the request includes a desired outcome (e.g., a prediction of data values in a future time period). In some aspects, the request may be associated with a model user.

At step 2004, model input data is received, the model input data having a data category. For example, the data category may be stock market data, rainfall data, transaction data, climate data, health data, educational outcome data, demographic data, sales data, poll data, etc. Model input data may be composed entirely of actual data, a mix of actual data and synthetic data, or entirely of synthetic data. In some embodiments, receiving model input data includes receiving model input data from at least one of a database (e.g., database 105) or an interface (e.g., interface 113). For example, in some embodiments, model optimizer 107 may receive model input data in a manner consistent with the disclosed embodiments. In some embodiments, receiving model input data includes receiving a plurality of model input datasets. The plurality of model input datasets may be received based on a schedule. In some embodiments, the model input data may have been received as part of the modeling request (step 2002).

At step 2006, a model is provided in response to the request. For example, the provided model may be transmitted to a client device via interface 113 from model optimizer 107. In some embodiments, providing a provided model at step 2006 includes generating a model, consistent with disclosed embodiments. Generating a model may include training a model using model input data. In some embodiments, providing a model includes retrieving a model from a model storage (e.g., model storage 109). In some embodiments, the provided model is one of a synthetic data model or a predictive model. In some embodiments, the provided model may be a GAN, a recurrent neural network model, a convolutional neural network model, or other machine learning model. The model of step 2006 has one or more baseline model parameters and one or more baseline model hyperparameters.

At step 2008, synthetic data is generated by the system of process 2000. In some embodiments, step 2008 is performed if the provided model is a synthetic data model. Step 2008 may be based on the provided model and the model input data and/or other data, consistent with disclosed embodiments. That is, step 2008 and subsequent steps are performed by the system using a version of the model provided in response to the model request.

At optional step 2010, a data metric of the generated data is determined, consistent with disclosed embodiments. For example, in some embodiments, model optimizer 107 may determine a data metric in a manner consistent with the disclosed embodiments. In some embodiments, step 2010 is skipped.

At optional step 2012, the model may be updated based on model input data. For example, in some embodiments, model optimizer 107 may update the model in a manner consistent with the disclosed embodiments. In some embodiments, updating the model includes training the model and generates an updated model parameter. In some embodiments, updating the model includes hyperparameter training and generates an updated hyperparameter. In some embodiments, step 2012 is skipped.

At step 2014, data drift is detected based on at least one of a data metric, an updated model parameter, or an updated model hyperparameter. For example, data drift may be detected if a difference meets or exceeds a threshold difference in at least one of: a comparison of a generated data covariance matrix to a current data covariance matrix; a comparison of an updated model parameter to a previous model parameter; or a comparison of a model hyperparameter to a previous model hyperparameter. Detecting data drift at step 2014 may be based on a parameter threshold or a hyperparameter threshold as determined using process 1900, for example. In some embodiments, model optimizer 107 may detect data drift in a manner consistent with the disclosed embodiments.

At step 2016, performed if the provided model is a forecasting model or classification model, predicted data is generated. For example, in some embodiments, model optimizer 107 may generate predicted data in a manner consistent with the disclosed embodiments. The predicted data of step 2010 may be one of forecasting data or classification data is generated, consistent with disclosed embodiments.

At step 2018, event data is received, consistent with disclosed embodiments. Event data may be received via interface 113. In some embodiments, receiving event data includes retrieved from memory (e.g., from database 105).

At step 2020, data drift is detected based on a difference between the event data and the predicted data. For example, data drift may be detected if a difference meets or exceeds a threshold difference between predicted data to event data, consistent with disclosed embodiments. In some embodiments, model optimizer 107 may detect data drift in a manner consistent with the disclosed embodiments.

At step 2022, the model may be corrected based on a detected data drift. For example, in some embodiments, model optimizer 107 may correct the model in a manner consistent with the disclosed embodiments. Correcting the model may include model training or hyperparameter tuning based on event data, consistent with disclosed embodiments. Correcting the model may include model training or hyperparameter tuning based on event data, consistent with disclosed embodiments. In some embodiments, correcting the model at step 2022 includes storing the updated model in a model storage (e.g., model storage 109) or providing an updated model to a model user via, for example, interface 113. Updating the model may include storing the updated model in a model storage (e.g., model storage 109).

At step 2024, a notification may be sent to a device (e.g., a client device, a server, a mobile device, a personal computer, or the like) or an account (e.g., an email account, a user account, or the like). For example, in some embodiments, model optimizer 107 may send a notification in a manner consistent with the disclosed embodiments. In some embodiments, the notification is sent to the device associated with the request for a model (step 2002). The notification may state that data drift has been detected and/or that the model has been corrected. Notifying a model user may include providing, to a device associated with the model user, the corrected model, e.g., via interface 113.

In some embodiments, detecting data drift includes a combination of methods described above in processes 1800, 1900, or 2000. That is, detecting data drift may be based on at least one of: a comparison of generated data to event data; a comparison of generated data covariance matrix to event data covariance matrix; a comparison of an updated model parameter to a previous model parameter; or a comparison of a model hyperparameter to a previous model hyperparameter.

Example: Generating Cancer Data

As described above, the disclosed systems and methods can enable generation of synthetic data similar to an actual dataset (e.g., using dataset generator). The synthetic data can be generated using a data model trained on the actual dataset (e.g., as described above with regards to FIG. 9). Such data models can include generative adversarial networks. The following code depicts the creation a synthetic dataset based on sensitive patient healthcare records using a generative adversarial network.

```
# The following step defines a Generative Adversarial
Network data model.
    model_options={'GANhDim': 498, 'GANZDim': 20,
'num epochs': 3}
# The following step defines the delimiters present in the
actual data
    data_options={'delimiter': ','}
# In this example, the dataset is the publicly available
University of Wisconsin Cancer dataset, a standard dataset
used to benchmark machine learning prediction tasks. Given
characteristics of a tumor, the task to predict whether the
tumor is malignant.
    data=Data
(input_file_path='wisconsin_cancer_train.csv',
options=data_options)
# In these steps the GAN model is trained generate data
statistically similar to the actual data.
    ss=SimpleSilo('GAN', model_options)
    ss.train(data)
# The GAN model can now be used to generate synthetic
data.
    generated_data=ss.generate(num_output_samples=5000)
# The synthetic data can be saved to a file for later use in
training other machine learning models for this prediction
task without relying on the original data.
    simplesilo.save_as_csv(generated_data,
output_file_path='wisconsin_cancer_GAN.csv')
    ss.save_model_into_file('cancer_data_model')
```

Tokenizing Sensitive Data

As described above with regards to at least FIGS. 5A and 5B, the disclosed systems and methods can enable identification and removal of sensitive data portions in a dataset. In this example, sensitive portions of a dataset are automatically detected and replaced with synthetic data. In this example, the dataset includes human resources records. The sensitive portions of the dataset are replaced with random values (though they could also be replaced with synthetic data that is statistically similar to the original data as described in FIGS. 5A and 5B). In particular, this example depicts tokenizing four columns of the dataset. In this example, the Business Unit and Active Status columns are tokenized such that all the characters in the values can be replaced by random chars of the same type while preserving format. For the column of Employee number, the first three characters of the values can be preserved but the remainder of each employee number can be tokenized. Finally, the values of the Last Day of Work column can be replaced with fully random values. All of these replacements can be consistent across the columns.

```
    input_data=Data('hr_data.csv')
    keys_for_formatted_scrub={'Business Unit':None,
'Active Status': None, 'Company': (0,3)}
    keys_to_randomize=['Last Day of Work']
    tokenized_data, scrub_map=input_data.tokenize
(keys_for_formatted_scrub=keys_for_formatted_scrub,
keys_to_randomize=keys_to_randomize) tokenized_
data.save_data_into_file('hr_data_tokenized.csv')
```

Alternatively, the system can use the scrub map to tokenize another file in a consistent way (e.g., replace the same values with the same replacements across both files) by passing the returned scrub map dictionary to a new application of the scrub function.

```
    input_data_2=Data('hr_data_part2.csv')
    keys_for_formatted_scrub={'Business Unit':None,
'Company': (0,3)}
    keys_to_randomize=['Last Day of Work']
# to tokenize the second file, we pass the scrub_map
diction to tokenize function.
    tokenized_data_2, scrub_map=input_data_2.tokenize
(keys_for_formatted_scrub=keys_for_formatted_scrub,
keys_to_randomize=keys_to_randomize,
scrub_map=scrub_map)
    tokenized_data_2.save_data_into_file
('hr_data_tokenized_2.csv')
```

In this manner, the disclosed systems and methods can be used to consistently tokenize sensitive portions of a file.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above-described examples, but instead are defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A system for detecting data drift, the system comprising:
   one or more memory units for storing instructions; and
   one or more processors configured to execute the instructions to perform operations comprising:
      receiving model training data;
      generating a predictive model;
      receiving model input data;
      generating predicted data using the predictive model, based on the model input data;
      receiving event data,
      detecting data drift based on a comparison of a data profile of the predicted data to a data profile of the event data; and
      correcting the model based on the determined drift.

2. The system of claim 1, the operations comprising:
   generating a predicted data covariance matrix based on the predicted data; and
   generating an event data covariance matrix based on the event data;
   wherein determining data drift is based on a comparison of the predicted data covariance matrix to the event data covariance matrix.

3. The system of claim 2, wherein:
   the model input data comprises a plurality of model input datasets, each dataset comprising data associated with a different scenario.

4. The system of claim 1, wherein the model is one of a recurrent neural network model, a deep learning model, or a convolutional neural network model.

5. The system of claim 1, wherein generating a model comprises generating a development instance to generate the model.

6. The system of claim 1, the operations comprising generating a development instance in response to the received event data;
   wherein detecting data drift is performed by the development instance.

7. The system of claim 1, wherein generating the predictive model comprises training the predictive model, wherein training the model terminates upon satisfaction of a termination condition.

8. The system of claim 7, wherein the termination condition is based on a performance metric of the predictive model, an elapsed time, a number of predictive models trained, a number of epochs, an accuracy score, or a rate of change of an accuracy score.

9. The system of claim 1, wherein generating the predictive model comprises hyperparameter tuning of the predictive model.

10. The system of claim 9, wherein the hyperparameter tuning comprises:
    adjusting a hyperparameter of the predictive model;
    training the predictive model using the adjusted hyperparameter;
    determining a performance metric of the trained predictive model; and
    terminating hyperparameter tuning if the performance metric meets or exceeds a threshold.

11. The system of claim 10, wherein the adjusted hyperparameter comprises at least one of a number of layers in a neural network, an activation function for a neural network node, or a filter in a convolutional neural network.

12. The system of claim 1, wherein the predicted data is stock market data, rainfall data, transaction data, climate data, health data, educational outcome data, demographic data, sales data, or poll data.

13. The system of claim 1, wherein correcting the predictive model comprises at least one of training the predictive model based on the event data or performing a hyperparameter tuning of the predictive model based on the event data.

14. The system of claim 1, wherein the model input data comprises a mix of actual data and synthetic data.

15. The system of claim 1, wherein the model input data comprises data of a first category, and the predicted data comprises data of a first category.

16. The system of claim 15, wherein the model input data comprise data of a second category, and the predicted data does not comprise data of the second category.

17. The system of claim 1, wherein detecting data drift is based on at least one of a Mean Absolute Error method, a Root Mean Squared Error method, or a percent good classification method.

18. A method for detecting data drift, the method comprising:
    receiving model training data;
    generating a predictive model;
    receiving model input data;
    generating predicted data using the predictive model, based on the model input data;
    receiving event data,
    detecting data drift based on a comparison of a data profile of the predicted data to a data profile of the event data; and
    correcting the model based on the determined drift.

19. A system for updating a model, the system comprising one or more memory units for storing instructions; and
    one or more processors configured to execute the instructions to perform operations comprising:
       receiving a modeling request associated with a user;
       providing a predictive model based on the modeling request;
       generating predicted data using the model, the predicted data being of a data category;
       receiving event data, the event data being of the same data category as the predicted data;
       detecting data drift based on at least one of:
          a comparison of a data profile of a predicted data to the data profile of the event data; or
          a comparison of a predicted data covariance matrix to an event data covariance matrix;
       updating the predictive model based on the detected data drift; and
       transmitting a notification that the predictive model has been updated.

* * * * *